(12) United States Patent
Li et al.

(10) Patent No.: US 11,659,377 B2
(45) Date of Patent: *May 23, 2023

(54) PROFILE DOWNLOAD METHOD AND DEVICE

(71) Applicant: Huawei Technologies Co., Ltd., Shenzhen (CN)

(72) Inventors: Feng Li, Shenzhen (CN); Wen Liu, Xi'an (CN); Chunlai Feng, Shenzhen (CN); Tao Li, Beijing (CN); Xiaolin Li, Dongguan (CN); Xutao Gao, Xi'an (CN); Wenhua Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,755

(22) Filed: Jul. 15, 2021

(65) Prior Publication Data
US 2022/0007174 A1 Jan. 6, 2022

Related U.S. Application Data

(63) Continuation of application No. 16/943,390, filed on Jul. 30, 2020, now Pat. No. 11,082,833, which is a
(Continued)

(30) Foreign Application Priority Data

Oct. 31, 2016 (CN) .......................... 201610928977.9
Nov. 9, 2016 (WO) ................ PCT/CN2016/105237

(51) Int. Cl.
*H04W 8/18* (2009.01)
*H04W 8/20* (2009.01)
(Continued)

(52) U.S. Cl.
CPC ............. *H04W 8/205* (2013.01); *H04W 4/50* (2018.02); *H04W 12/06* (2013.01); *H04W 12/40* (2021.01)

(58) Field of Classification Search
CPC . H04W 8/205; H04W 12/0023; H04W 12/04; H04W 12/02; H04W 12/10;
(Continued)

(56) References Cited

U.S. PATENT DOCUMENTS 8,666,368 B2    3/2014  Schell et al.
2010/0290456 A1* 11/2010 Mutikainen ............. H04W 8/04
                                                                370/352
(Continued)

FOREIGN PATENT DOCUMENTS

CN    104703170 A    6/2015
CN    105050071 A    11/2015
(Continued)

OTHER PUBLICATIONS

3GPP TS 24.239 V13.0.0, Dec. 2015, 3rd Generation Partnership Project; Technical Specification Group Core Network and Terminals; Flexible Alerting (FA) using IP Multimedia (IM) Core Network (CN) subsystem; Protocol specification (Release 13), 23 pages.

*Primary Examiner* — Nathan S Taylor
(74) *Attorney, Agent, or Firm* — Conley Rose, P.C.

(57) ABSTRACT

A profile download method includes a primary device obtaining an embedded integrated circuit card identifier (EID) of a secondary device, where the EID is used by the primary device to obtain, from a mobile operator server, profile download information that matches the EID. The primary device receives the profile download information from the mobile operator server and sends the profile download information to the secondary device, where the profile download information is used by the secondary
(Continued)

device to download a profile from a profile management server, and where the profile is installed in an embedded UICC (eUICC) of the secondary device after the download is complete.

20 Claims, 19 Drawing Sheets

Related U.S. Application Data continuation of application No. 16/346,532, filed as application No. PCT/CN2017/088142 on Jun. 13, 2017, now Pat. No. 10,764,745.

(51) Int. Cl.
*H04W 4/50* (2018.01)
*H04W 12/06* (2021.01)
*H04W 12/40* (2021.01)

(58) Field of Classification Search
CPC ....... H04W 4/60; H04W 60/00; H04W 88/02; H04W 8/18; H04W 8/183; H04W 8/245; H04W 8/025; H04W 4/50; H04W 12/004; H04W 12/06; H04L 63/126; H04L 67/26; H04L 67/303; H04L 9/3247
USPC .................................................. 455/411, 419
See application file for complete search history.

(56) References Cited

U.S. PATENT DOCUMENTS

| | | | |
|---|---|---|---|
| 2011/0312301 A1* | 12/2011 | Muller | H04W 12/06 |
| | | | 455/411 |
| 2012/0278869 A1* | 11/2012 | Guccione | H04L 63/102 |
| | | | 726/5 |
| 2014/0115676 A1* | 4/2014 | Coghlan | H04W 12/069 |
| | | | 726/6 |
| 2015/0281946 A1 | 10/2015 | Cheung et al. | |
| 2015/0303966 A1 | 10/2015 | Lee et al. | |
| 2015/0350411 A1* | 12/2015 | Blom | H04W 12/06 |
| | | | 455/411 |
| 2016/0020803 A1 | 1/2016 | Soon et al. | |
| 2016/0050557 A1* | 2/2016 | Park | H04W 8/205 |
| | | | 455/419 |
| 2016/0150400 A1 | 5/2016 | Soon et al. | |
| 2016/0283216 A1* | 9/2016 | Gao | H04L 63/0428 |
| 2016/0301529 A1* | 10/2016 | Park | H04W 8/205 |
| 2016/0330608 A1 | 11/2016 | Benn | |
| 2017/0064552 A1* | 3/2017 | Park | H04L 9/3273 |
| 2017/0156051 A1 | 6/2017 | Park et al. | |
| 2018/0103370 A1* | 4/2018 | Park | H04W 8/20 |
| 2018/0367984 A1 | 12/2018 | Park et al. | |
| 2019/0208405 A1* | 7/2019 | Park | H04W 8/20 |
| 2019/0253874 A1* | 8/2019 | Salmela | H04W 60/00 |
| 2019/0253884 A1* | 8/2019 | Fan | H04W 8/183 |
| 2019/0327603 A1* | 10/2019 | De Figueiredo Junior | |
| | | | H04W 88/06 |
| 2019/0357038 A1* | 11/2019 | Schouler | H04W 8/20 |
| 2019/0373471 A1* | 12/2019 | Li | H04L 63/0853 |
| 2020/0053534 A1* | 2/2020 | Bae | H04L 67/562 |
| 2020/0059778 A1* | 2/2020 | Li | H04W 12/40 |

FOREIGN PATENT DOCUMENTS

| | | |
|---|---|---|
| CN | 105050073 A | 11/2015 |
| CN | 105282731 A | 1/2016 |
| CN | 106162602 A | 11/2016 |
| EP | 2963955 A1 | 1/2016 |
| EP | 2975871 A1 | 1/2016 |
| EP | 3024261 A1 | 5/2016 |
| GB | 2522044 A | 7/2015 |
| KR | 20160002326 A | 1/2016 |
| WO | 2016167536 A1 | 10/2016 |
| WO | 2017027115 A1 | 2/2017 |

* cited by examiner

PROFILE DOWNLOAD METHOD AND DEVICE

CROSS-REFERENCE TO RELATED APPLICATIONS

This is a continuation of U.S. patent application Ser. No. 16/943,390 filed on Jul. 30, 2020, which is a continuation of U.S. patent application Ser. No. 16/346,532, filed on Apr. 30, 2019, now U.S. Pat. No. 10,764,745, which is a National Stage of International Patent Application No. PCT/CN2017/088142 filed on Jun. 13, 2017, which claims priority to Chinese Patent Application No. 201610928977.9, filed on Oct. 31, 2016 and International Patent Application No. PCT/CN2016/105237 filed on Nov. 9, 2016. All of the aforementioned applications are incorporated herein by reference in their entireties.

TECHNICAL FIELD

Embodiments of this application relate to the field of communications technologies, and more specifically, to a profile download method and a device.

BACKGROUND

Currently, a removable universal integrated circuit card (UICC) is configured for most mobile devices to operate and access a service provided by a mobile network operator (MNO). The MNO generally allocates one subscriber identification number to each user terminal that uses a UICC card, that is, one subscriber identification number is corresponding to one user terminal. However, with the development of technologies, a quantity of user terminals held by an individual user keeps increasing. Particularly, with an increase of embedded UICC (eUICC) devices, a demand for sharing one subscriber identification number by two or more user terminals of one user (that is, a multiple IMSI single MSISDN (multiple IMSI numbers with a single MSISDN) service) keeps increasing.

When handling the multiple IMSI single MSISDN service, a customer usually needs to go to an MNO customer service center to submit a service application, and a salesperson activates the multiple IMSI single MSISDN service according to the customer application. In this way, the customer needs to spend time and energy on the handling in the customer service center. Consequently, customer experience is poor, and promotion of the MNO service is affected.

If the multiple IMSI single MSISDN service needs to be activated for a device that uses an eUICC, a customer needs to go to a customer service center to scan a quick response code, so as to download a profile (profile) of an MNO network from the MNO network. The profile may be a software-type packet of subscriber information of the MNO subscribed by the device user. To activate the multiple IMSI single MSISDN service, the user needs to confirm and sign a subscription document of the multiple IMSI single MSISDN service on-site. In this way, the customer service center not only needs to add a device for scanning the quick response code, but also needs to train the salesperson in a procedure of provisioning the multiple IMSI single MSISDN service. Financial costs and staff training costs of the operator are high due to a large quantity of customer service centers.

Therefore, how to provide a technology for conveniently downloading the profile and activating the multiple IMSI single MSISDN service to reduce the costs of the user/operator is a technical problem that needs to be urgently resolved by a person skilled in the art.

SUMMARY

This specification describes a profile download method and a device, so as to improve convenience of downloading a profile and activating a multiple IMSI single MSISDN service, thereby reducing costs of a user/an operator.

According to a first aspect, an embodiment of this application provides a profile download method. The profile download method may be applied to a primary device that has an integrated circuit card UICC. The primary device may apply for profile download information for a secondary device. The method includes: obtaining an embedded integrated circuit card identifier (EID) of the secondary device, where the EID is used by the primary device to obtain, from a mobile operator server, profile download information that matches the EID; receiving, from the mobile operator server, the profile download information that matches the EID; and sending the profile download information to the secondary device, where the profile download information is used by the secondary device to download a profile from a profile management server, and the profile is installed in an embedded UICC (eUICC) of the secondary device after the download is complete.

When activating a network service of a mobile network operator MNO for the primary device, a user needs to purchase the UICC and activate a corresponding package through real-name registration, so as to use a network and an application service of the MNO. The secondary device purchased by the user uses the eUICC, and the user does not want to go to a customer service center and scan a quick response code to download the profile of the operator network from the MNO network. By using the method in the first aspect, the secondary device may complete profile download by using the primary device, thereby facilitating an operation of the user.

In a possible design, after the profile of the secondary device is downloaded and installed, the primary device may further apply to the MNO for a multiple IMSI single MSISDN service, that is, one mobile station international ISDN number MSISDN is corresponding to international mobile subscriber identities IMSIs of a plurality of devices. The primary device sends a multiple IMSI single MSISDN service activation request to the mobile operator server, where the multiple IMSI single MSISDN service activation request carries an identifier of the primary device and an identifier of the secondary device, the identifier of the primary device includes any one of an integrated circuit card identifier (Integrate Circuit Card Identity, ICCID), a mobile station international ISDN number MSISDN, and an international mobile subscriber identity IMSI, and the identifier of the secondary device includes any one of the EID, an MSISDN, and an IMSI.

In a possible design, the primary device may request to activate the multiple IMSI single MSISDN service when applying to the MNO for the profile download information for the secondary device. The primary device sends the EID and the identifier (ICCID, MSISDN, or IMSI) of the primary device to the mobile operator server, and the mobile operator server registers and activates the multiple IMSI single MSISDN service for the primary device and the secondary device.

In a possible design, to apply for the profile download information for the secondary device, the primary device needs to sign a contract and approve a service term of the MNO by using a web page.

In a possible design, the primary device obtains the EID of the secondary device by using a Bluetooth connection or a WiFi connection between the primary device and the secondary device.

In a possible design, the primary device needs to be authenticated by the mobile network operator. An authentication manner may be Extensible Authentication Protocol-subscriber identity module/Authentication and Key Agreement EAP-SIM/AKA authentication or SMS verification code authentication. After the primary device is authenticated, the mobile network operator server sends the EID to the profile management server and instructs the profile management server to prepare the profile and the profile download information.

In a possible design, the primary device may further apply to the MNO for a multiple IMSI single MSISDN service unbinding request, that is, to unbind multiple IMSI single MSISDN service binding between the primary device and the secondary device, and cancel an FA or MAH service between the primary device and the secondary device. The secondary device may request the profile management server to release a profile resource and delete the profile in the eUICC of the secondary device.

In a possible design, the primary device performs a pairing operation with the secondary device, and sends a profile download request for the secondary device to the mobile operator server. The profile download request is then sent by the mobile operator server to the profile management server, and the profile management server prepares the profile download information and the profile. Because the primary device is a UICC device and cannot directly access the profile management server, the profile download request needs to be sent to the profile management server by using the mobile operator server.

According to another aspect, an embodiment of this application provides a terminal. The terminal has a function of implementing the primary device in the foregoing method design. The function may be implemented by hardware, or may be implemented by executing corresponding software by hardware. The hardware or the software includes one or more modules corresponding to the foregoing function. The module may be the software and/or the hardware.

In a possible design, the terminal includes a communications unit, a universal integrated circuit card UICC, and a processor. The processor is configured to support a device in performing a corresponding function in the foregoing method design. The device may include a memory. The memory is configured to be coupled to the processor, and stores a program instruction and data that are necessary for the processor.

According to still another aspect, an embodiment of this application provides a computer storage medium, configured to store a computer software instruction used by the foregoing device. The computer storage medium includes a program designed to execute the foregoing aspect.

According to yet another aspect, an embodiment of this application provides another device. The device includes an embedded integrated circuit card eUICC and a processor. The processor is configured to: send an EID to a primary device; receive, from the primary device, profile download information that matches the EID; and download a profile from a profile management server according to the profile download information, where the profile is installed in the eUICC after the download is complete.

According to still yet another aspect, an embodiment of this application provides another terminal. The terminal includes an integrated circuit card UICC and a processor. The processor is configured to: obtain an identifier of a secondary device, where the identifier of the secondary device includes any one of an ICCID, an MSISDN, and an IMSI, and the secondary device has the UICC; send a multiple IMSI single MSISDN service request to a mobile operator server, where the multiple IMSI single MSISDN service request carries an identifier of the terminal and the identifier of the secondary device, and the identifier of the primary device includes any one of an ICCID, an MSISDN, and an IMSI; and receive a multiple IMSI single MSISDN service activation result from the mobile operator server.

According to a further aspect, an embodiment of this application provides a profile download method. The profile download method is applied to an electronic device that has a universal integrated circuit card UICC and an embedded UICC (eUICC). The method includes: authenticating, based on the UICC, the electronic device with a mobile operator network; receiving authentication completion information from the mobile operator network; sending, based on the authentication completion information, an embedded integrated circuit card identifier (EID) of the eUICC to the mobile operator network, where the EID is used by the electronic device to obtain, from a server of the mobile operator network, profile download information that matches the EID; receiving the profile download information from the server of the mobile operator network; and downloading a profile from a profile management server according to the profile download information, where the profile is installed in the eUICC of the electronic device after the download is complete.

In a possible design, an authentication manner may be Extensible Authentication Protocol-subscriber identity module/Authentication and Key Agreement EAP-SIM/AKA authentication or SMS verification code authentication.

In this way, for the electronic device with both the UICC and the eUICC, the UICC may be used to verify validity of a user and download an eUICC profile for the eUICC.

According to a still further aspect, an embodiment of this application provides another terminal. The terminal includes: a communications unit, a universal integrated circuit card UICC, an embedded UICC (eUICC), and a processor. The processor is configured to: authenticate, based on the UICC, the electronic device with a mobile operator network; obtain authentication completion information from the mobile operator network; based on the authentication completion information, control the communications unit to send an embedded integrated circuit card identifier (EID) of the eUICC to the mobile operator network, where the EID is used by the electronic device to obtain, from a server of the mobile operator network, profile download information that matches the EID; obtain the profile download information from the server of the mobile operator network; and download a profile from a profile management server according to the profile download information, where the profile is installed in the eUICC of the electronic device after the download is complete.

In a possible design, an authentication manner may be Extensible Authentication Protocol-subscriber identity module/Authentication and Key Agreement EAP-SIM/AKA authentication or SMS verification code authentication.

According to a yet further aspect, an embodiment of this application provides a profile download method. The profile download method includes: sending, by a second device, a profile obtaining request to a server of a mobile operator network, where the profile obtaining request carries an embedded integrated circuit card identifier (EID) of the second device and a mobile station international ISDN number MSISDN of a first device, and the EID is used by the second device to obtain, from the server of the mobile operator network, profile download information that matches the EID; sending, by the second device, a verification code to the server of the mobile operator network, where the verification code is a verification code received by the first device (for example, a user may use the second device to manually enter the verification code received by the first device, or a user may use the second device to obtain, by using short-range communication (for example, NFC) or in a manner of scanning a quick response code, the verification code received by the first device); receiving, by the second device, the profile download information from the mobile operator server; and downloading, by the second device, a profile from a profile management server according to the profile download information, where the profile is installed in an embedded UICC (eUICC) of the second device after the download is complete.

In a possible design, an authentication manner may be Extensible Authentication Protocol-subscriber identity module/Authentication and Key Agreement EAP-SIM/AKA authentication or SMS verification code authentication.

In this way, for a case in which the user has two electronic devices, the first device may be used to verify validity of the user and download an eUICC profile for the second device.

According to a still yet further aspect, an embodiment of this application provides another terminal. The terminal includes: a communications unit, an embedded UICC (eUICC), and a processor. The processor is configured to: control the communications unit to send a profile obtaining request to a server of a mobile operator network, where the profile obtaining request carries an embedded integrated circuit card identifier (EID) of the terminal and a mobile station international ISDN number MSISDN of a first device, and the EID is used by the terminal to obtain, from the server of the mobile operator network, profile download information that matches the EID; control the communications unit to send a verification code to the server of the mobile operator network, where the verification code is a verification code received by the first device; obtain the profile download information from the mobile operator server; and download a profile from a profile management server according to the profile download information, where the profile is installed in the embedded UICC (eUICC) of the terminal after the download is complete.

In a possible design, an authentication manner may be Extensible Authentication Protocol-subscriber identity module/Authentication and Key Agreement EAP-SIM/AKA authentication or SMS verification code authentication.

Compared with the prior art, the solutions provided in this application may improve convenience of profile download and convenience of multiple IMSI single MSISDN service activation.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
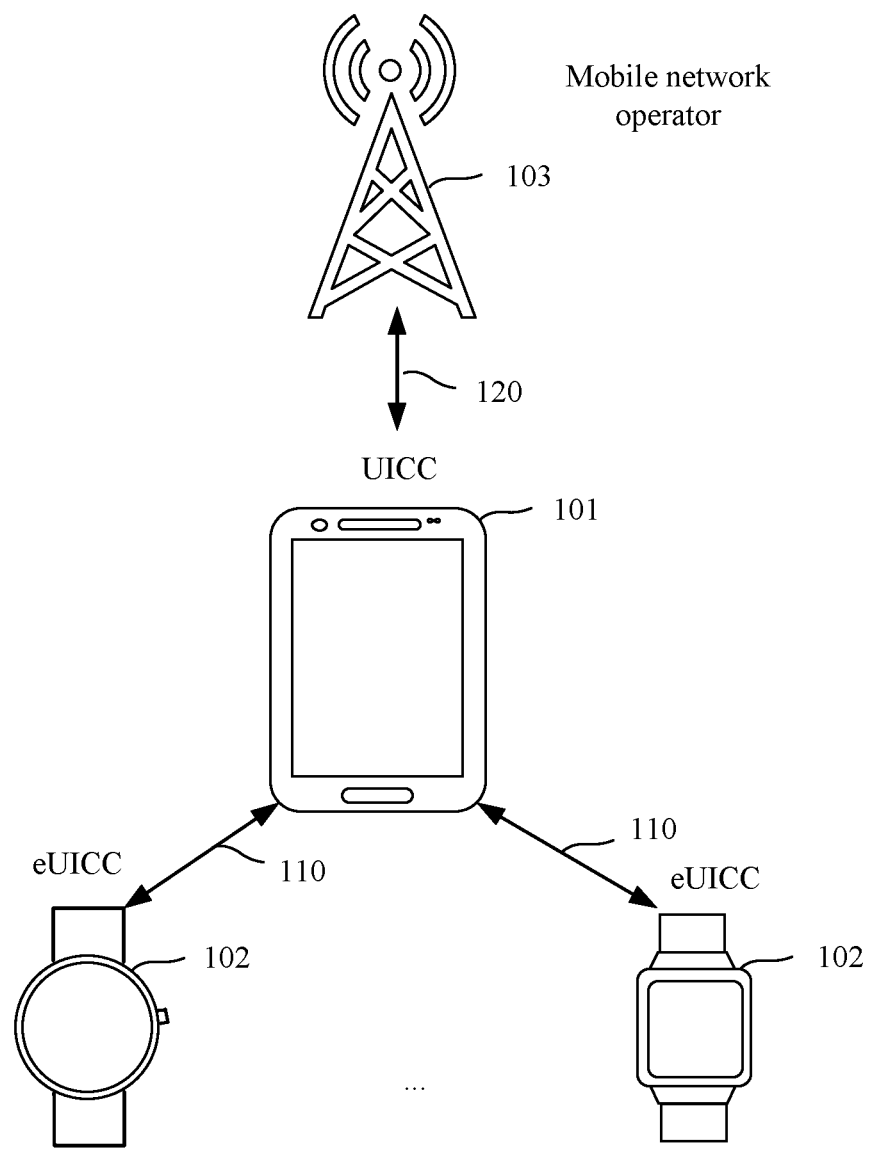
FIG. 1 is a schematic diagram of a profile download system according to an embodiment of this application.

The following clearly and completely describes the technical solutions in the embodiments of this application with reference to the accompanying drawings in the embodiments of this application. A profile download method and a device provided in the embodiments of this application may be applied to any mobile terminal such as a cellular phone, a PDA (personal digital assistant), a 2G/3G/4G/5G terminal, or a WLAN (wireless local area network) terminal, so as to provide a service such as profile download and multiple IMSI single MSISDN service activation for the device.

In the description of this application, it should be understood that the terms "first", "second", "third", and the like are merely used for a descriptive purpose, and cannot be understood to indicate a primary and secondary relationship, and therefore cannot be construed as a limitation on this application.

A multiple IMSI single MSISDN service is a service that one mobile station international ISDN number MSISDN (Mobile Station International ISDN Number) is corresponding to a plurality of international mobile subscriber identity IMSI (International Mobile Subscriber Identity) numbers, that is, a plurality of mobile terminals may use different SIM cards but share one MSISDN number. When these mobile terminals serve as called parties, a service procedure of the mobile terminals is classified into two procedures: mobile access hunting (Mobile Access Hunting, MAH) and flexible alerting (Flexible Alerting, FA).

FA procedure: A user dials an FA pilot number, and a system rings all called terminals. When any one of the called terminals answers, the system immediately stops ringing the other called terminals. For example, a phone number of a mobile terminal A is bound to a mobile phone number of a mobile terminal B, and the phone number of the mobile terminal A is configured as the FA pilot number. When the user dials the pilot number, the registered mobile terminals A and B ring simultaneously. The ringing mobile terminals A and B herein are referred to as members. After one member answers, the other member stops ringing. The FA pilot number may be a member number of a member piloted by the FA pilot number, or may be a virtual number.

MAH procedure: The user dials an MAH pilot number, and the system first rings a first called terminal according to a ringing sequence set by a called user in a home location register (HLR, Home Location Register). If the first called terminal is not connected, the system rings a next called terminal in sequence until one called terminal answers. Similarly, the MAH pilot number may be a member number of a member piloted by the MAH pilot number, or may be a virtual number.

With the development of technologies, a quantity of user terminals held by an individual user keeps increasing. Particularly, with an increase of wearable devices (for example, a smartwatch and a smart band), a demand for activating the multiple IMSI single MSISDN service between two or more user terminals of one user keeps increasing. Currently, when handling the multiple IMSI single MSISDN service, a customer usually needs to go to an MNO customer service center to submit a service application, and a salesperson activates the multiple IMSI single MSISDN service according to the customer application. This undoubtedly increases costs of the user/an operator.

The wearable device starts to appear in a growing quantity of usage occasions because of a feature of the wearable device such as a small size and portability. However, a function of the wearable device is relatively simple due to the small size and a limited hardware resource of the wearable device. Currently, most wearable devices on sale on the market only have a function such as physiological index monitoring, a time display, an SMS message display, and a Bluetooth call. An eUICC may provide advantages superior to a conventional removable UICC. The eUICC is configured to store an MNO profile (profile) used by a plurality of devices to register with an MNO and interact with the MNO. The profile may be a software-type packet (for example, an eSIM) of subscriber information of the MNO subscribed by a device user. Some eUICCs include a rewritable memory and provide an electronic subscriber identity module (eSIM) that has a function similar to that of the conventional removable subscriber identity module SIM card. The eSIM is more flexible than the SIM card, because the eSIM may be added to the rewritable memory of the eUICC and may be modified in or removed from the rewritable memory of the eUICC. Therefore, emergence of an eUICC technology greatly extends an application of the wearable device in communication services, for example, a call service, an SMS, a voice and video service, and a mail service.

Activating the multiple IMSI single MSISDN service between devices such as a smartphone and a smartwatch implements an FA or MAH telephone service between a plurality of devices of a user. This can significantly improve terminal customer experience. For example, when the mobile phone cannot be used due to a fault, a loss, forgetting, or a power failure, the user can still implement a function such as receiving or making a call by using the watch. This greatly facilitates work and life of the user.

To activate the multiple IMSI single MSISDN service for an intelligent device that uses an eUICC, a problem that is to be first resolved is to download a profile.

FIG. 1 is a schematic diagram of a profile download system according to an embodiment of this application.

Referring to FIG. 1, the profile download system includes a first device (also referred to as a primary device) 101. The first device 101 is equipped with a universal integrated circuit card (UICC) that can be inserted into the first device 101 and that can be removed from the first device 101. The UICC stores personal information of a mobile communication subscriber, such as network access certificate information, a phone book, and an SMS message. When a mobile communications network such as GSM, WCDMA, or LTE is connected, the UICC performs subscriber identification and service security key creation, and therefore allows a secure use of mobile communication. A communication application such as a SIM and a USIM may be installed in the UICC, and other various applications such as a mobile credit card, a mobile wallet, or an electronic passport may be installed in the UICC.

The first device 101 has a radio communication circuit, and may communicate with a mobile network operator (MNO) 103 through a radio link 120 by using a wireless wide area network (Wireless Wide Area Network, WWAN) protocol. The WWAN protocol includes: a GSM/GPRS protocol, a CDMA protocol, an EDGE protocol, an EV-DO protocol, an EV-DV protocol, an HSDPA protocol, an LTE protocol, and the like. The MNO 103 may include at least one of a subscription server, an authorization server, or a BOSS system.

The first device 101 may communicate with a second device 102 by using a short-range wireless communications link 110. For example, the first device 101 may communicate with the second device 102 by using a Bluetooth (Bluetooth), ZigBee, or WiFi (IEEE 802.11) protocol.

FIG. 1 includes more than one second device (also referred to as a secondary device) 102. For example, the second device 102 may include a smartwatch, a smart wrist strap, a smart ring, and the like. The second device 102 uses an embedded UICC (eUICC) that replaces the UICC and that is embedded into the terminal in an irremovable manner. The eUICC includes at least one of an irremovable secure element (Secure Element, SE) or a removable secure element. Because the secure element is installed in the second device 102 in an irremovable manner during manufacturing of the second device 102, it is impossible to install network access authentication information such as an IMSI or a USIM of a specific mobile network operator in advance during manufacturing of the terminal. Therefore, a user who purchases the device can establish such authentication information only after accessing a specific operator. For example, a profile (profile) may be downloaded by using an OTA (over the air) technology and installed in the eUICC.

In addition, contrary to a typical UICC that is only manufactured and started for a specific mobile network operator, the newly introduced eUICC that is embedded into the terminal should securely and flexibly install and manage authentication information of various mobile network operators as the user accesses or leaves a specific mobile network operator or changes to another operator.

The first device 101 of the user has accessed a network of the MNO 103, for example, has purchased the UICC of the MNO 103 and activated a 3G/4G package through real-name registration, and may use the network and an application service of the MNO 103. The second device 102 purchased by the user uses the eUICC, and the user does not want to go to a customer service center and scan a quick response code to download the profile of the operator network from the network of the MNO 103. The first device 101 of the user is already a customer of the MNO 103, and can use the network and the application service of the MNO 103. Therefore, the user wants to use the first device 101 to apply for profile download and activate a multiple IMSI single MSISDN service for the second device 102, so as to implement an FA or MAH telephone service between the first device 101 and the second device 102 of the user.

Figure 2:
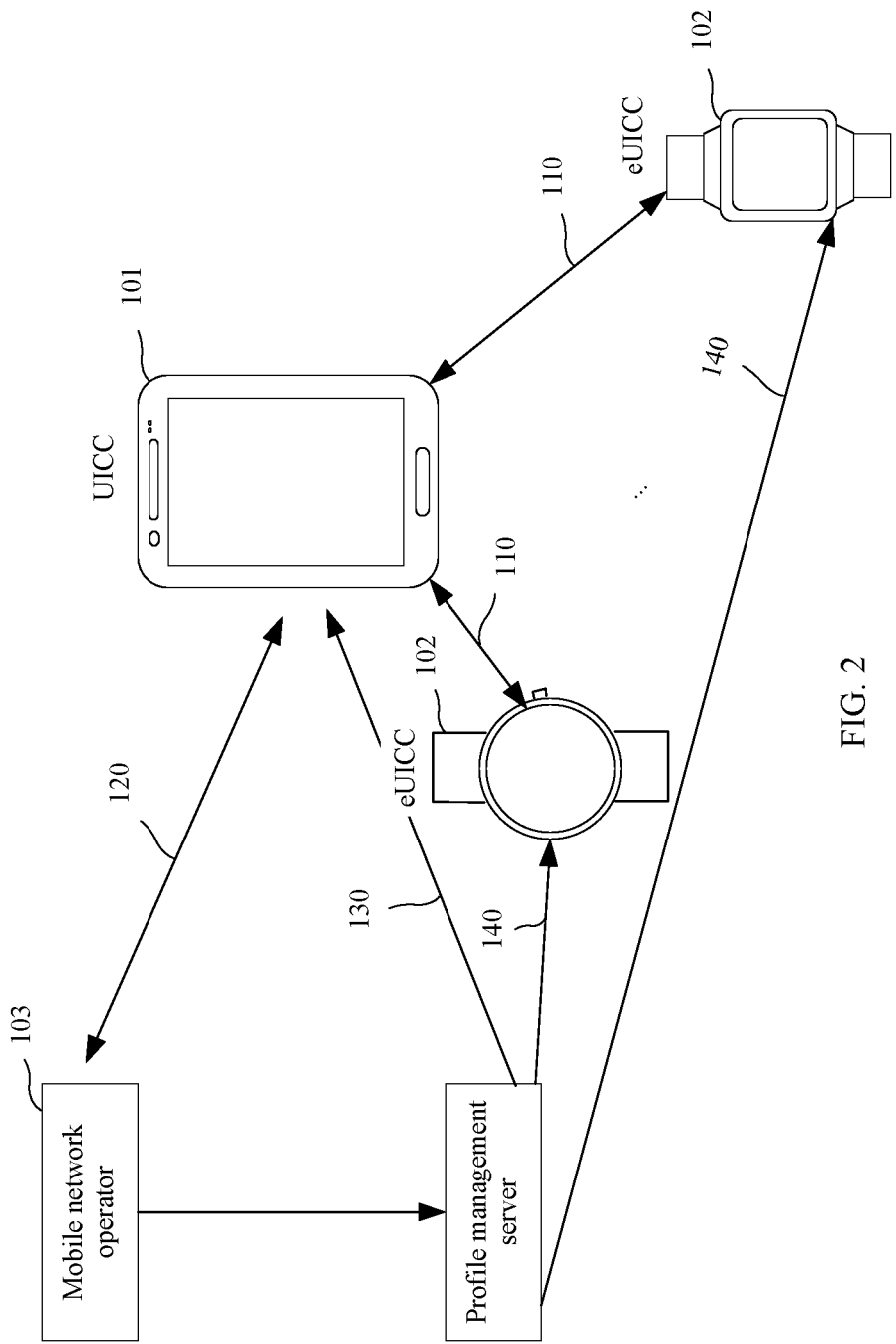
FIG. 2 is a schematic diagram of a profile download system according to another embodiment of this application.

FIG. 2 is a schematic diagram of a profile download system according to another embodiment of this application.

Referring to FIG. 2, in step 120, a first device 101 of a user has accessed a network of an MNO 103, and sends a profile download request to the MNO 103. In this case, an eUICC of a second device 102 has not downloaded a profile, and needs to first download the profile from the MNO 103. The first device 101 sends an EID (eUICC identifier) of the second device 102 to the MNO 103.

In step 130, the MNO 103 provides profile download information to the first device 101 by using a profile management server. The profile download information may include an activation code (Activation Code), and the activation code may include an address of the profile server. The first device 101 transfers the activation code to the second device 102 by using a short-range wireless communications link 110. A specific process of downloading the profile by using the activation code is described in detail in a GSMA specification RSP Architecture Version 1.0 (Dec. 23, 2015). Details are not described herein. In an implementation, the profile management server may be a subscription manager-data preparation+ (Subscription Manager Data Preparation, SM-DP+). In another implementation, the profile management server may include a subscription manager-data preparation (Subscription Manager Data Preparation, SM-DP) and a subscription manager-secure routing (Subscription Manager Secure Routing, SM-SR).

The activation code may be a quick response code. The quick response code may be temporarily generated for the user by the profile management server of the operator when the user subscribes to the operator. Alternatively, the quick response code may be generated by the profile management server of the operator in advance. The activation code may carry download information required for achieving target profile download, and the user may obtain the profile download information by using a user terminal to scan the quick response code.

In step 140, the second device 102 scans the activation code to download the profile from the profile management server by using a WiFi network. Alternatively, the second device 102 may use the first device 101 to indirectly access the profile management server by using a Bluetooth connection to the first device 101, and download the profile from the profile management server. After the second device 102 completes profile preparation, the first device 101 may send a multiple IMSI single MSISDN service activation request again to the MNO 103. The multiple IMSI single MSISDN service activation request carries an identifier of the first device 101 and an identifier of the second device 102. The identifier of the first device 101 may be an integrated circuit card identifier (Integrate Circuit Card Identity, ICCID), an MSISDN, and an IMSI of the first device 101. The identifier of the second device 102 may be the EID (eUICC identifier), an MSISDN, and an IMSI of the second device 102. Afterward, the MNO 103 activates the multiple IMSI single MSISDN service according to the identifier of the first device 101 and the identifier of the second device 102, so as to implement an FA or MAH telephone service between the first device 101 and the second device 102 of the user.

Figure 3:
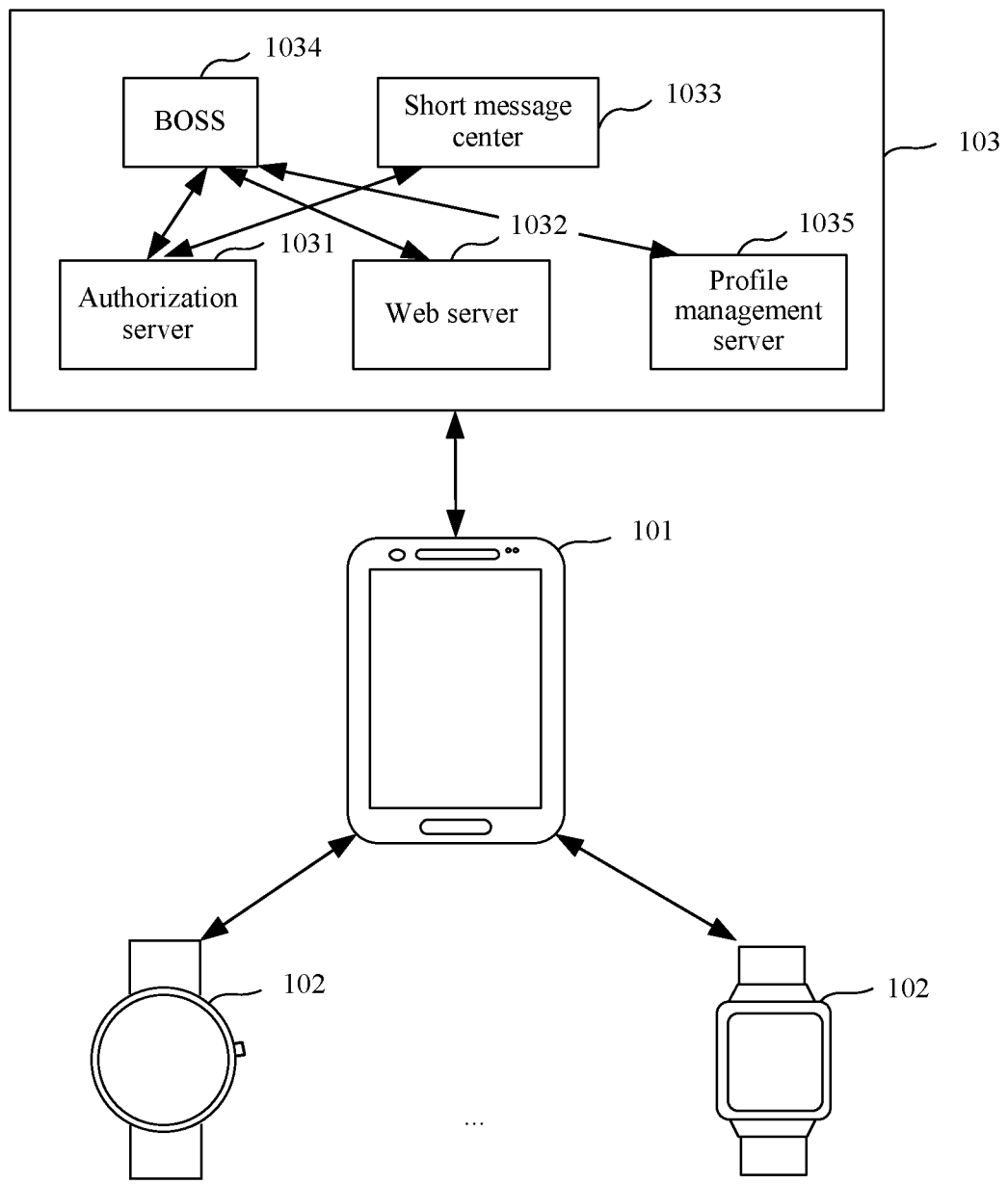
FIG. 3 is a schematic diagram of a profile download system according to still another embodiment of this application.

FIG. 3 is a schematic diagram of a profile download system according to still another embodiment of this application.

Referring to FIG. 3, the profile download system includes a first device 101 and a second device 102. An authorization server (Authorization Server, AS) 1031, a web server (Web Server) 1032, a profile management server 1035, a BOSS system 1034, a short message center 1033, and the like are deployed in an operator network 103.

The BOSS is short for Business & Operation Support System, that is, a business and operation support system. Generally, the BOSS system is divided into four parts: a billing and settlement system, an operating and accounting system, a customer service system, and a decision support system. The BOSS system bears a service system, a CRM system, and a billing system of an MNO.

The authorization server (Authorization Server, AS) 1031 is mainly configured to perform authentication (authentication) on the first device 101 to verify validity of the first device 101. An authentication operation may be performed by using an extensible authentication protocol that is based on a Global System for Mobile Communications identity authentication module and an extensible authentication protocol that is based on 3rd Generation Mobile Communication Authentication and Key Agreement (Authentication Protocol for 3G Authentication and Key Agreement, EAP-AKA) in a cellular mobile network. The authentication operation may alternatively use a verification code method. For example, the MNO randomly generates a verification code, and sends, by using the short message center 1033, an SMS message to a mobile phone number used by the first device 101 of a user, so as to notify the user of the verification code. The user enters the verification code to perform secondary verification, so as to ensure subscriber identity correctness.

The web server (Web Server) 1032 is mainly responsible for a network subscription operation of the user. For example, the web server 1032 returns a contracted page to the first device 101. The contracted page includes a service term of the operator about downloading a profile or activating a multiple IMSI single MSISDN service. The contracted page further includes a click box for contract approval and a click box for contract disapproval. If the user clicks the click box for contract approval, the operator starts to prepare the profile and/or activate the multiple IMSI single MSISDN service for the user.

The profile management server may generate profile download information and the profile for the user. The profile management server may include at least one of network side devices such as an SM-DS, an SM-DP, an SM-SR, or an SM-DR.

Figure 4:
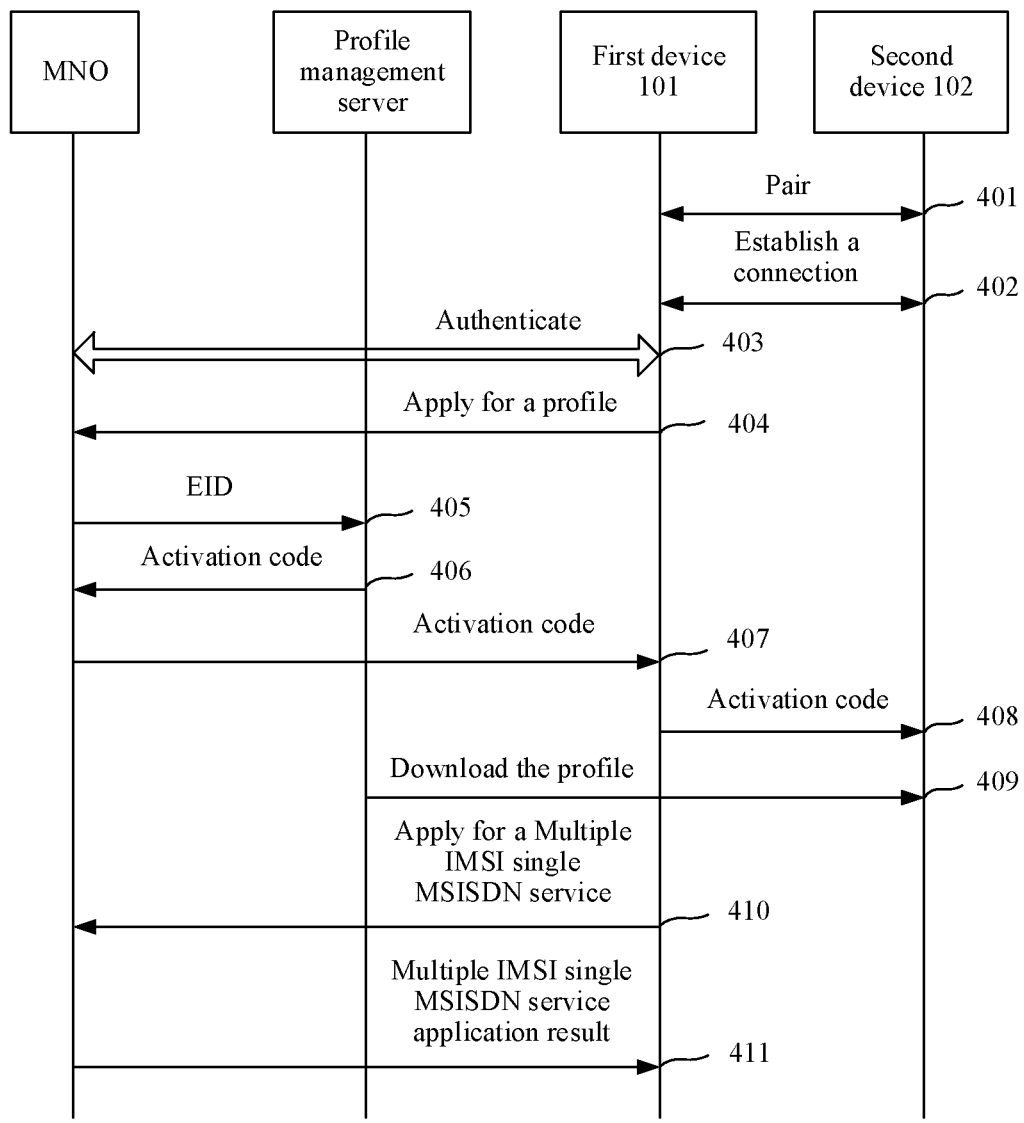
FIG. 4 is a schematic diagram of a profile download method according to an embodiment of this application.

FIG. 4 is a schematic diagram of a profile download method according to an embodiment of this application.

Referring to FIG. 4, in step 401, a first device 101 performs a Bluetooth pairing operation with a second device 102, and the pairing operation may be implemented by using a UI interface of the first device 101. Afterward, in step 402, a Bluetooth connection is established between the first device 101 and the second device 102 to transmit data, and the first device 101 may obtain an EID (eUICC identifier) of the second device 102 by using the Bluetooth connection. In step 403, the first device 101 and an MNO perform an authentication operation to verify validity of the first device 101. The authentication operation may use a verification code method. For example, the MNO randomly generates a verification code, and sends an SMS message to a mobile phone number used by the first device 101 of a user, so as to notify the user of the verification code. The user enters the verification code to perform secondary verification, so as to ensure subscriber identity correctness. The authentication operation in step 404 may alternatively use card-based EAP-SIM/AKA authentication. The first device 101 completes authentication according to an authentication protocol, and accesses a network of the MNO. In step 404, the first device 101 sends a profile obtaining request to the MNO, where the profile obtaining request carries the EID (eUICC identifier) of the second device. In step 405, the MNO transfers the EID to a profile management server. In step 405, the MNO transfers the EID to the profile management server, and the profile management server prepares a profile activation code that matches the EID, and transfers the activation code to the MNO in step 406. In step 407, the MNO transfers the activation code to the first device 101. In step 408, the first device 101 transfers the activation code to the second device 102. In step 409, the second device 102 obtains a profile by using a WiFi network or by establishing a connection to the profile management server by using the first device 101. In step 410, the first device 101 sends a multiple IMSI single MSISDN service application to the MNO, where the multiple IMSI single MSISDN service application carries an identifier of the first device 101 and an identifier of the second device 102. The identifier of the first device 101 may be an integrated circuit card identifier (Integrate Circuit Card Identity, ICCID), an MSISDN, and an IMSI. The identifier of the second device 102 may be the EID (eUICC identifier), an MSISDN, and an IMSI. Afterward, the MNO 103 activates the multiple IMSI single MSISDN service according to the identifier of the first device 101 and the identifier of the second device 102. In this way, the MSISDN of the first device 101 may be corresponding to the IMSI of the first device 101 and the IMSI of the second device 102, so as to implement an FA or MAH telephone service between the first device 101 and the second device 102 of the user.

It should be noted that step 403 in FIG. 4 may occur before step 401 and step 402, that is, the first device 101 is authenticated by the mobile network operator before the first device 101 and the second device 102 are paired.

If the user has a plurality of second devices 102, the user may apply for the multiple IMSI single MSISDN service for the first device 101 and the plurality of second devices 102 according to the method in FIG. 4.

Figure 5:
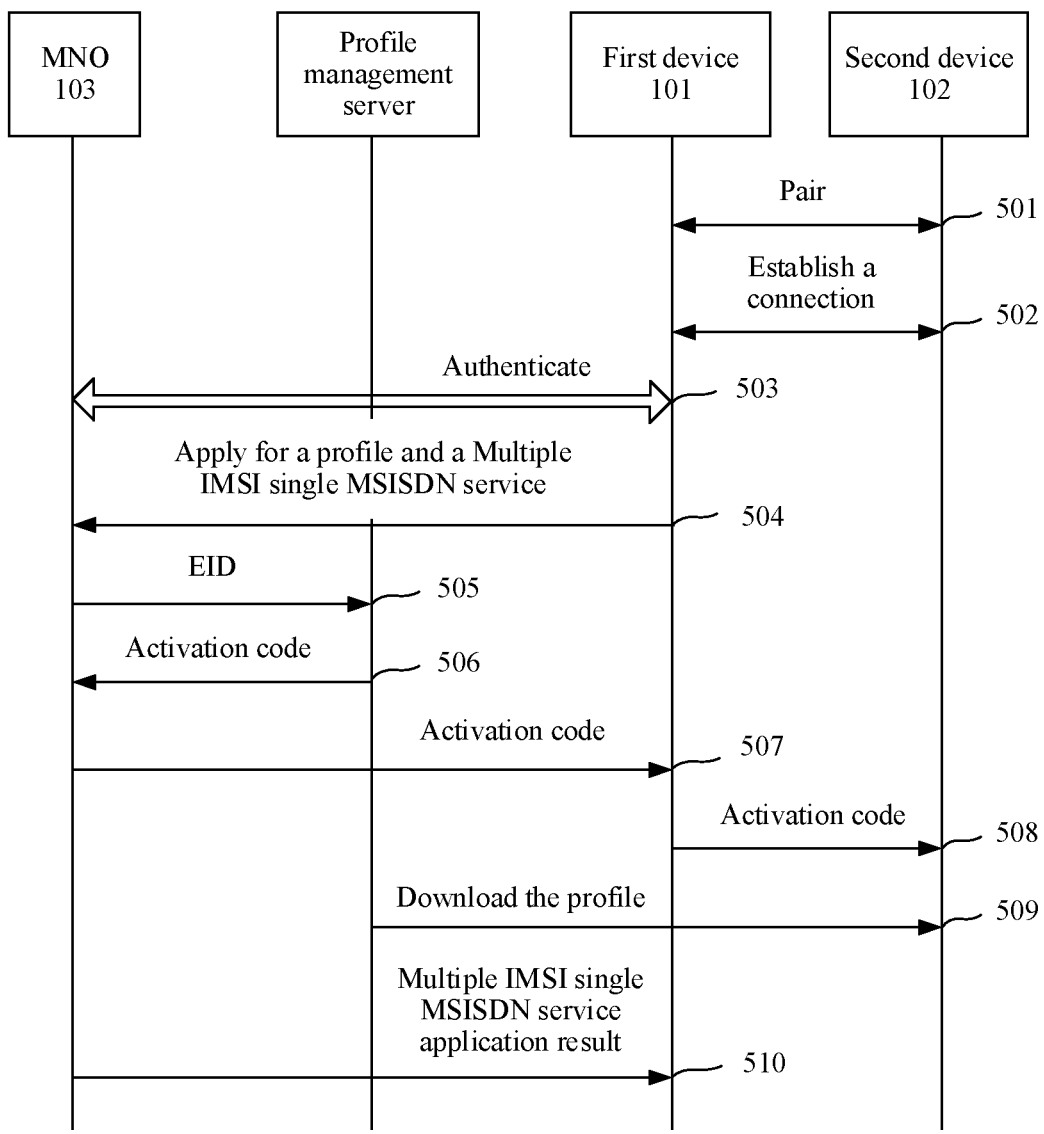
FIG. 5 is a schematic diagram of a profile download method according to another embodiment of this application.

FIG. 5 is a schematic diagram of a profile download method according to another embodiment of this application.

Referring to FIG. 5, step 501 to step 503 are similar to step 401 to step 403 in FIG. 4, and details are not described herein. In step 504, a first device 101 may trigger a profile download procedure when applying to an MNO 103 for a multiple IMSI single MSISDN service. The first device 101 provides an identifier (for example, an integrated circuit card identifier (Integrate Circuit Card Identity, ICCID), an MSISDN, and an IMSI) of the first device and an EID of a second device 102 for the MNO 103. The MNO 103 activates the multiple IMSI single MSISDN service according to the identifier of the first device 101 and the EID of the second device 102. Step 506 to step 509 are similar to step 406 to step 409 in FIG. 4, and details are not described herein. In step 509, the MNO 103 notifies the first device 101 of a multiple IMSI single MSISDN service application result. It should be noted that step 503 in FIG. 5 may occur before step 501 and step 502, that is, the first device 101 is authenticated by the mobile network operator before the first device 101 and the second device 102 are paired.

Figure 6A:
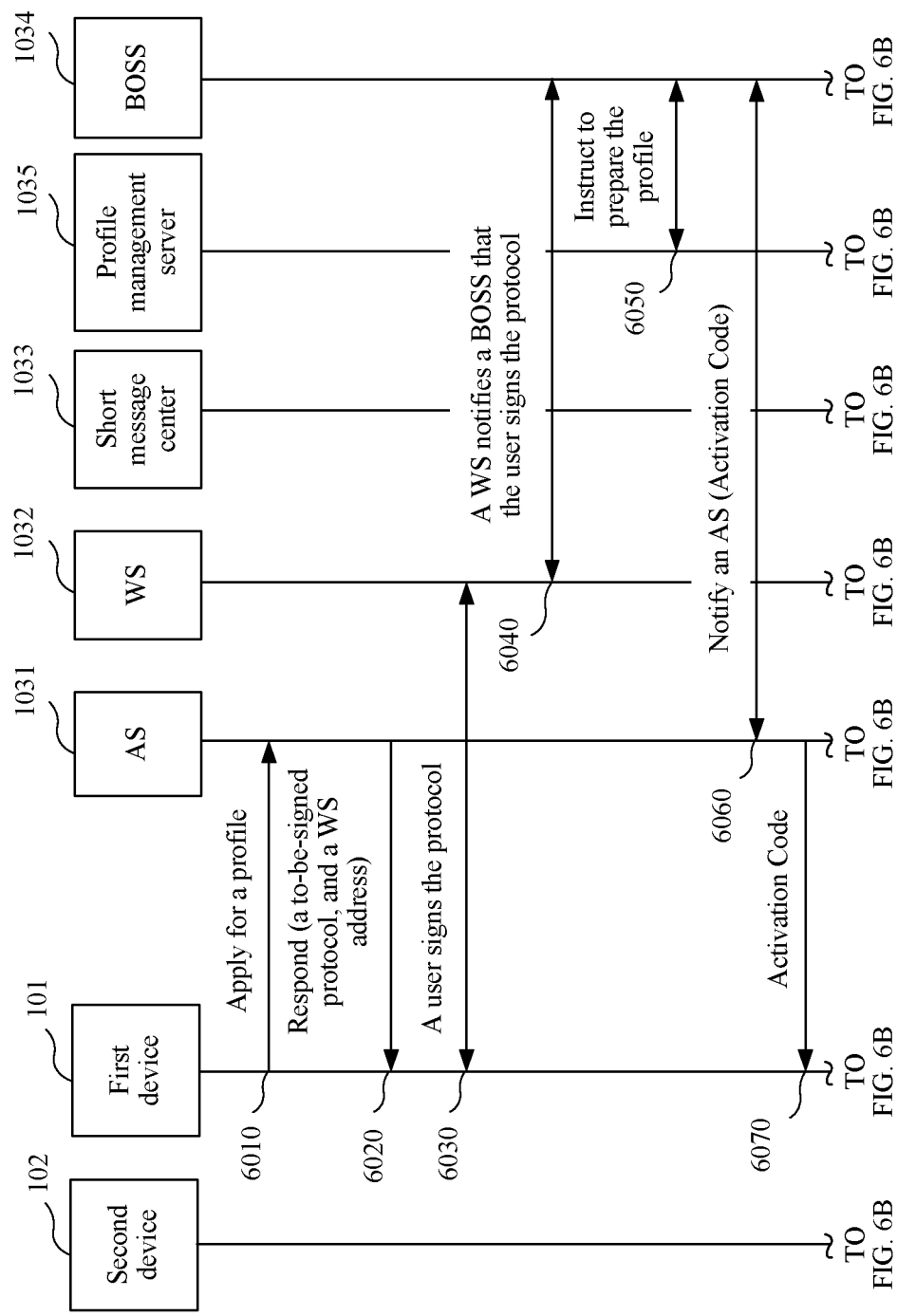
FIG. 6A, FIG. 6B, and FIG. 6C are a schematic diagram of a profile download method according to another embodiment of this application.
Figure 6B:
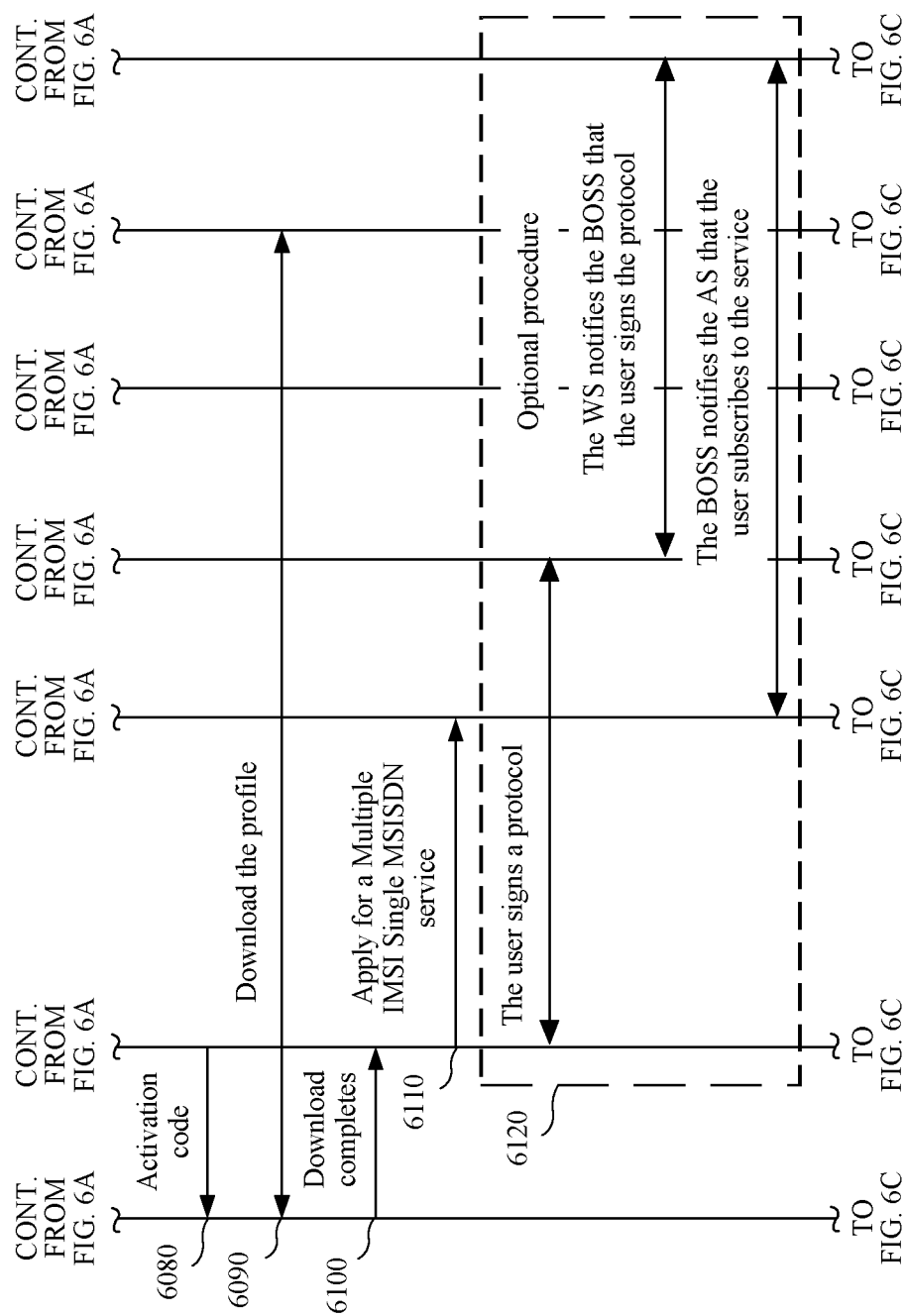
Figure 6C:
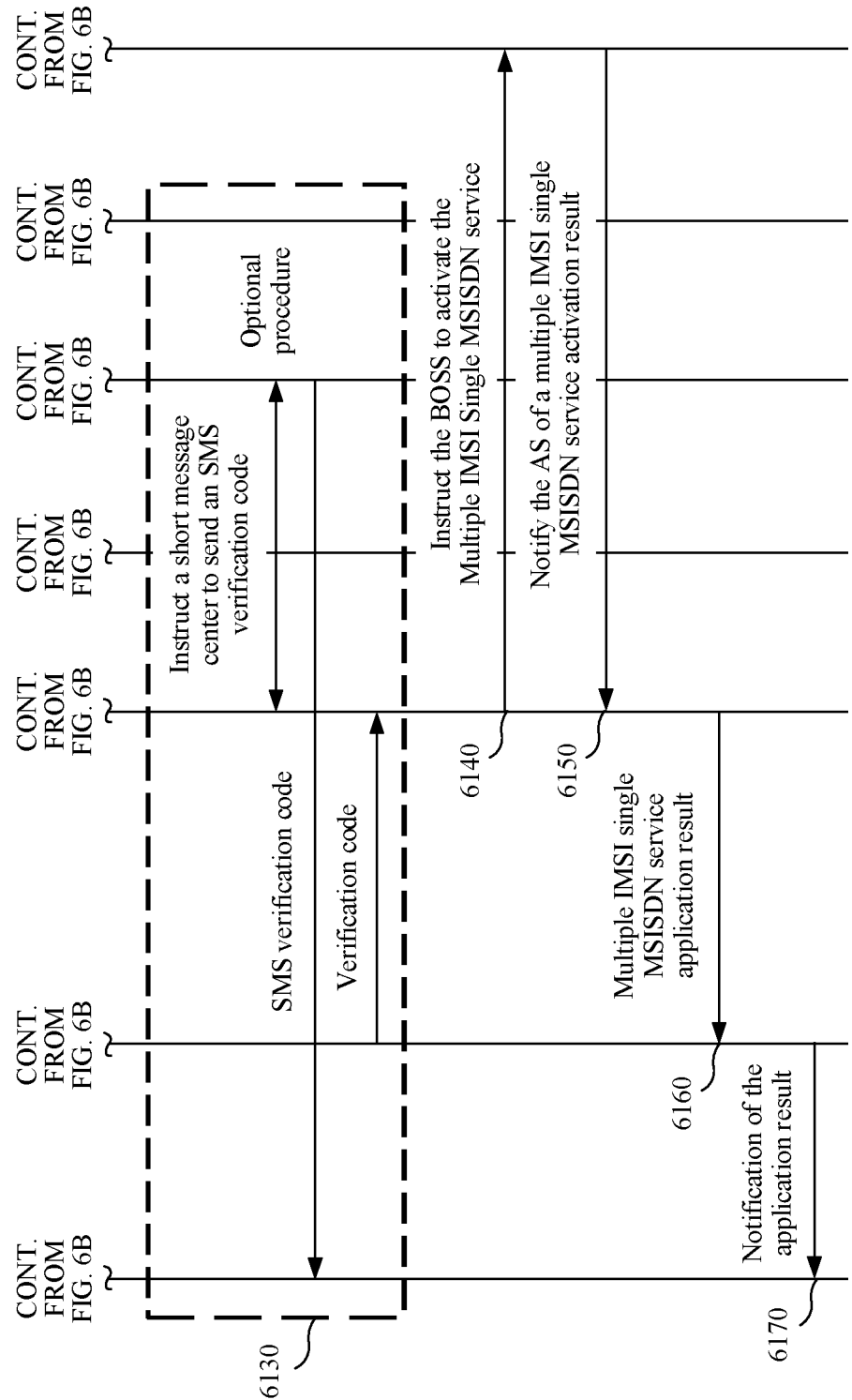

FIG. 6A, FIG. 6B, and FIG. 6C are a schematic diagram of a profile download method according to another embodiment of this application.

In step 6010, a first device 101 sends a profile obtaining request to an authorization server (Authorization Server, AS) 1031. The profile obtaining request carries an EID (eUICC identifier) of a second device 102, and the EID is a unique identifier allocated to each eUICC and is an unchangeable value.

In step 6020, the authorization server 1031 detects that a user does not sign a contract, and sends a contracted web page (contracted web page) website to the first device 101.

In step 6030, the first device 101 opens the contracted web page by using a web browser, and the contracted web page prompts the user whether to sign a contract with an operator, for example, displays a contract term, a click box for contract approval, and a click box for contract disapproval. The first device 101 obtains a subscription result of the user and sends the subscription result to a web server 1032. If the user clicks the click box for contract approval, it indicates that user subscription succeeds, and step 6040 is to be performed. If the user clicks the click box for contract disapproval, it indicates that the user disapproves the contract, and the process ends.

In step 6040, the WS 1032 sends the subscription result of the user to a BOSS system 1034.

In step 6050, the BOSS system 1034 instructs a profile management server 1035 to prepare a profile and profile download information (an activation code).

In step 6060, the BOSS system 1034 sends the activation code (Activation Code) to the authorization server 1031.

In step 6070, the authorization server 1031 sends the activation code (Activation Code) to the first device 101.

In step 6080, the first device 101 sends the activation code to the second device 102.

In step 6090, the second device 102 downloads the profile from the profile management server 1035 by using a radio link.

In step 6100, the second device 102 notifies the first device 101 that the profile is downloaded successfully.

In step 6110, the first device 101 sends a multiple IMSI single MSISDN service activation request to the authorization server (Authorization Server, AS) 1031, where the request carries an identifier of the first device 101 and an identifier of the second device 102. The identifier of the first device 101 may be an integrated circuit card identifier (Integrate Circuit Card Identity, ICCID), an MSISDN, and an IMSI. The identifier of the second device 102 may be the EID (eUICC identifier), an MSISDN, and an IMSI.

Step 6120 is an optional procedure. Optionally, the authorization server (Authorization Server, AS) 1031 learns, from the BOSS system 1034 of the operator, whether the user needs secondary subscription, and sends the contracted website to the first device 101 if the secondary subscription is needed. A specific subscription procedure is not described again. According to a service requirement of the operator, the operator may make a profile download process and a multiple IMSI single MSISDN service activation process be two independent operations. To activate the two operations, the user needs to separately sign corresponding protocols.

Step 6130 is an optional procedure. Optionally, SMS verification code verification is performed on the second device 102. The authorization server (Authorization Server, AS) 1031 instructs a short message center 1033 to send an SMS verification code to the first device 102, and the user sends the verification code to the authorization server (Authorization Server, AS) 1031 by using the first device 101, so as to verify validity of the second device 102.

In step 6140, the authorization server 1031 applies to the BOSS system 1034 for a multiple IMSI single MSISDN service for the first device 101 and the second device 102. The BOSS system 1034 is responsible for processing the multiple IMSI single MSISDN service of the first device 101 and the second device 102. In this case, the mobile station international ISDN number MSISDN (Mobile Station International ISDN Number) of the first device 101 is corresponding to the IMSI (International Mobile Subscriber Identity) number of the first device 101 and the IMSI number of the second device 102. That is, the first device 101 and the second device 102 may share one MSISDN number.

In step 6150, the BOSS system 1034 sends a multiple IMSI single MSISDN service activation result to the authorization server 1031.

In step 6160, the authorization server (Authorization Server, AS) 1031 sends the multiple IMSI single MSISDN service activation result to the first device 101.

In step 6170, the first device 101 sends the multiple IMSI single MSISDN service activation result to the second device 102.

Optionally, before step 6010, the first device 101 further needs to be authenticated by an MNO network. The authentication may use the EAP-SIM/AKA authentication or SMS verification code authentication mentioned above.

Figure 7:
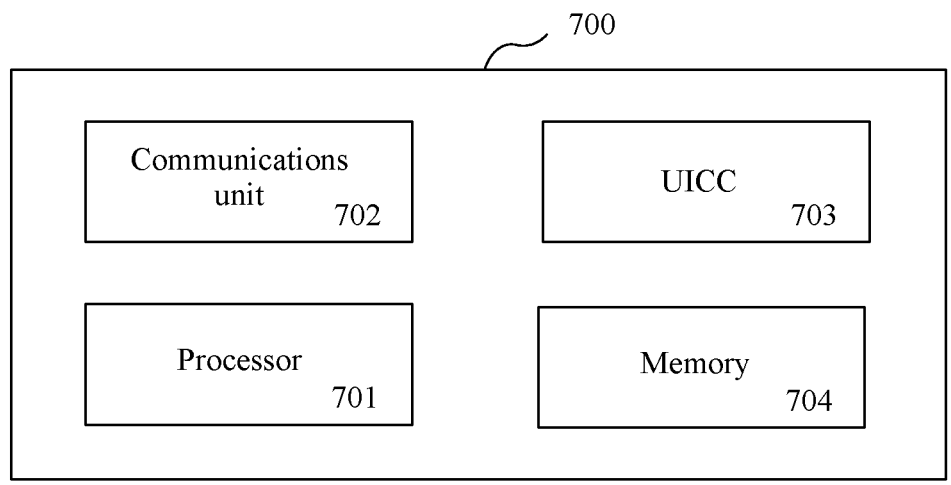
FIG. 7 is a component block diagram of a terminal according to an embodiment of this application.

FIG. 7 is a component block diagram of a terminal according to an embodiment of this application.

FIG. 7 shows a terminal 700. The terminal 700 includes a processor 701, a communications unit 702, a UICC 703, and a memory 704. The terminal 700 may be the first device 101 in FIG. 1 to FIG. 3. The communications unit 702 may support a short-range communications protocol such as Wi-Fi (wireless fidelity, Wireless Fidelity), Bluetooth (BT: Bluetooth), and Near Field Communication (NFC: near field communication), or support the Internet (Internet), a local area network (LAN: local area network), a wide area network (WAN: wire area network), a telecommunication network (telecommunication network), a cellular network (cellular network), a satellite network (satellite network), and the like. The communications unit 702 may further include a circuit that enables the terminal 700 to be coupled to another device (for example, a computer) and communicate with the another device in a wired or wireless manner.

The processor 701 is configured to execute an instruction (for example, an instruction obtained from a touchscreen), interrupt handling, timing, and other functions. In addition, the processor 701 may further include a graphics processing unit (graphic processing unit).

The terminal 700 may further include the memory (not shown), configured to store an instruction or data that is received by the processor 701 or another component (for example, an input module, a display module, or the communications unit), or generated by the processor 701 or another component.

The processor 701 is configured to: obtain an embedded integrated circuit card identifier (EID) of a secondary device (that is, the second device 102 in this specification), where the EID is used by a primary device to obtain, from a mobile operator server, profile download information that matches the EID; receive, from the mobile operator server, the profile download information that matches the EID; and send the profile download information to the secondary device, where the profile download information is used by the secondary device to download a profile from a profile management server, and the profile is installed in an embedded UICC (eUICC) of the secondary device after the download is complete.

The processor 701 is further configured to perform a corresponding function in the methods performed by the first device in FIG. 4 to FIG. 6A, FIG. 6B, and FIG. 6C.

The processor 701 is further configured to send a multiple IMSI single MSISDN (multiple IMSI numbers with a single MSISDN) service activation request to the mobile operator server, where the multiple IMSI single MSISDN service activation request carries an identifier of the primary device and an identifier of the secondary device, the identifier of the primary device includes any one of an integrated circuit card identifier (Integrate Circuit Card Identity, ICCID), a mobile station international ISDN number MSISDN, and an international mobile subscriber identity IMSI, and the identifier of the secondary device includes any one of the EID, an MSISDN, and an IMSI.

The EID is obtained by the terminal by using a Bluetooth connection or a WiFi connection between the terminal and the secondary device.

The processor 701 is further configured to authenticate the terminal with a mobile network operator. An authentication manner may be Extensible Authentication Protocol-subscriber identity module/Authentication and Key Agreement EAP-SIM/AKA authentication or SMS verification code authentication.

The processor 701 is further configured to: perform a pairing operation with the secondary device, and send a profile download request for the secondary device to the mobile operator server. The profile download request carries the EID.

The secondary device receives the profile download information, and according to the profile download information, downloads the profile from the profile management server and installs the profile. The terminal 700 obtains the EID (eUICC identifier) of the secondary device by using the connection (for example, the Bluetooth connection or the WiFi connection) between the terminal 700 and the secondary device.

Figure 8:
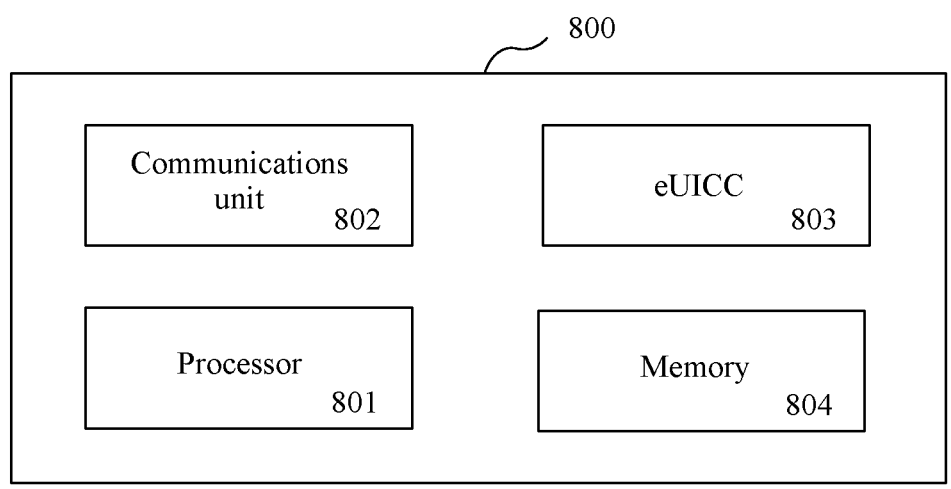
FIG. 8 is a component block diagram of a device according to another embodiment of this application.

FIG. 8 is a component block diagram of a device according to another embodiment of this application.

FIG. 8 shows a device 800. The device 800 includes a processor 801, a communications unit 802, an eUICC 803, and a memory 804. The device 800 may be the second device 102 in FIG. 1 to FIG. 3.

The communications unit 802 may support a short-range communications protocol such as Wi-Fi (wireless fidelity, Wireless Fidelity), Bluetooth (BT: Bluetooth), and Near Field Communication (NFC: near field communication), or support the Internet (Internet), a local area network (LAN: local area network), a wide area network (WAN: wire area network), a telecommunication network (telecommunication network), a cellular network (cellular network), a satellite network (satellite network), and the like. The communications unit 802 may further include a circuit that enables the device 800 to be coupled to another device (for example, a computer) and communicate with the another device in a wired or wireless manner.

The processor 801 is configured to execute an instruction (for example, an instruction obtained from a touchscreen), interrupt handling, timing, and other functions. In addition, the processor 801 may further include a graphics processing unit (graphic processing unit).

The device 800 may further include the memory (not shown), configured to store an instruction or data that is received by the processor 801 or another component (for example, an input module, a display module, or the communications unit), or generated by the processor 801 or another component.

The processor 801 is configured to: send an EID (eUICC identifier) of the second device 102 to a first device 101; receive, from the first device 101, profile download information that matches the EID; and according to the profile download information, download a profile from a profile management server and install the profile. The profile download information may be a quick response code. The second device identifies the quick response code to obtain information such as an address of the profile management server, so as to start to download the profile. The second device 102 transfers the EID (eUICC identifier) of the second device 102 to the first device 101 by using a connection (for example, a Bluetooth connection or a WiFi connection) between the first device 101 and the second device 102.

Figure 9:
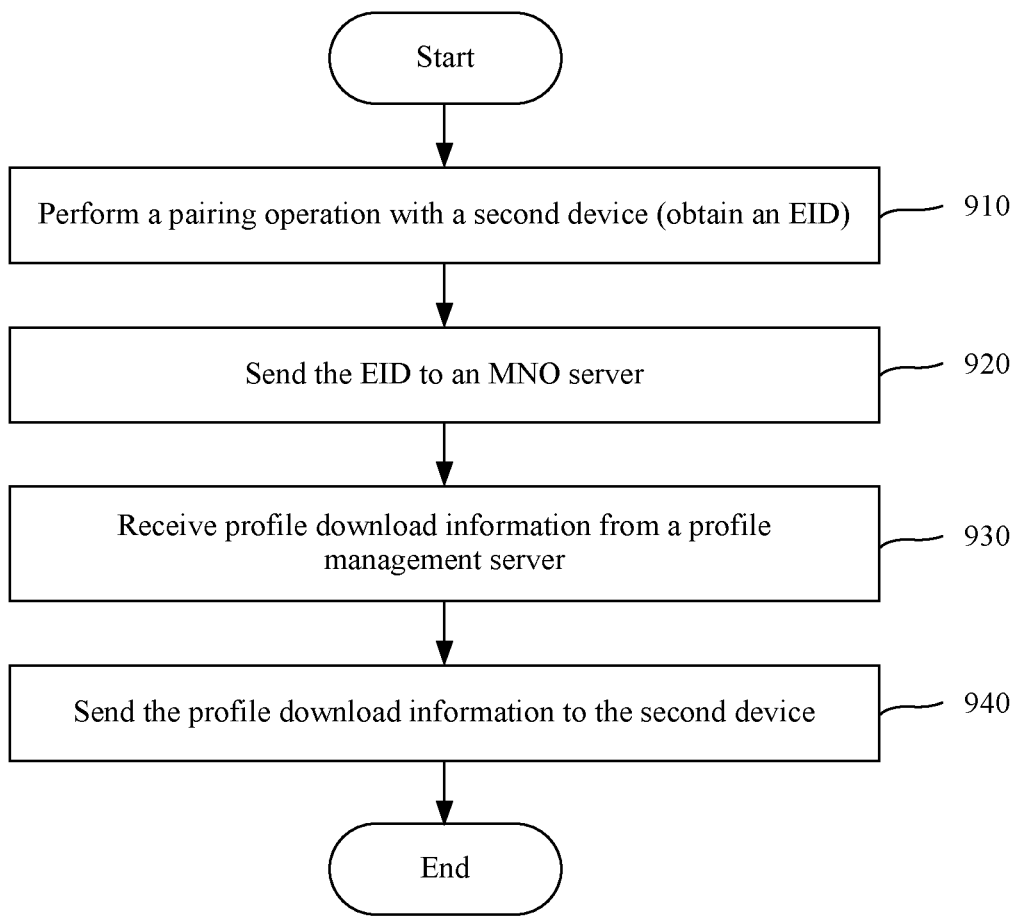
FIG. 9 is a flowchart of operations performed by a first device in a profile download method according to an embodiment of this application.

FIG. 9 is a flowchart of operations performed by a first device in a profile download method according to an embodiment of this application.

Referring to FIG. 9, in step 910, a first device performs a pairing operation with a second device. The pairing operation may use a Bluetooth or WiFi technology, but is not limited thereto. When the first device performs the pairing operation with the second device, the second device may transfer an EID of the second device to the first device. In step 920, the first device sends the EID of the second device to an MNO server, and then the MNO server sends the EID of the second device to a profile management server. In step 930, the first device receives download information from the profile management server. In step 950, the profile download information is sent to the second device. Afterward, according to the profile download information, the second device may download a profile from the profile management server and install the profile in an eUICC.

It should be noted that the first device 101 needs to be authenticated by a mobile network operator before step 910 in FIG. 9, that is, the first device 101 is authenticated by the mobile network operator before the first device 101 and the second device 102 are paired. An authentication manner may be an EAP-SIM/AKA manner or an SMS verification code manner.

Figure 10:
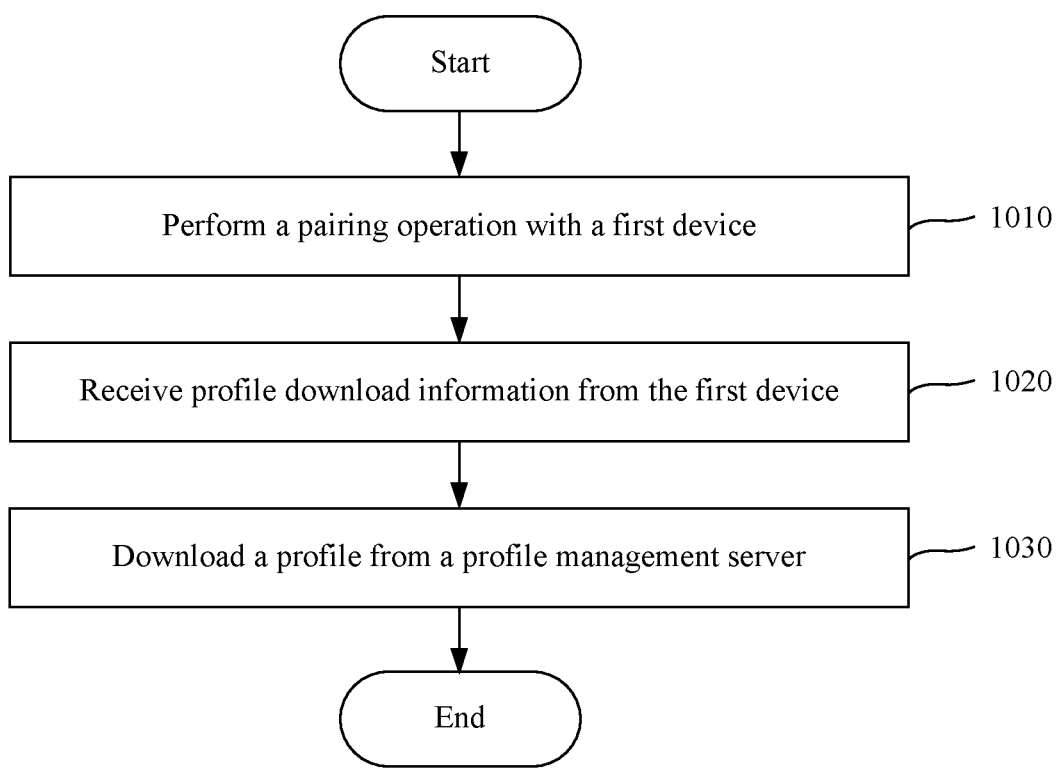
FIG. 10 is a flowchart of operations performed by a second device in a profile download method according to an embodiment of this application.

FIG. 10 is a flowchart of operations performed by a second device in a profile download method according to an embodiment of this application.

Referring to FIG. 10, in step 1010, a second device performs a pairing operation with a first device. The pairing operation may use a Bluetooth or WiFi technology, but is not limited thereto. When the first device performs the pairing operation with the second device, the second device may transfer an EID of the second device to the first device. In this case, the first device transfers the EID to a profile management server by using an MNO server, so as to obtain profile download information and transfer the profile download information to the second device. According to the profile download information, the second device may download a profile from the profile management server and install the profile in an eUICC.

Figure 11:
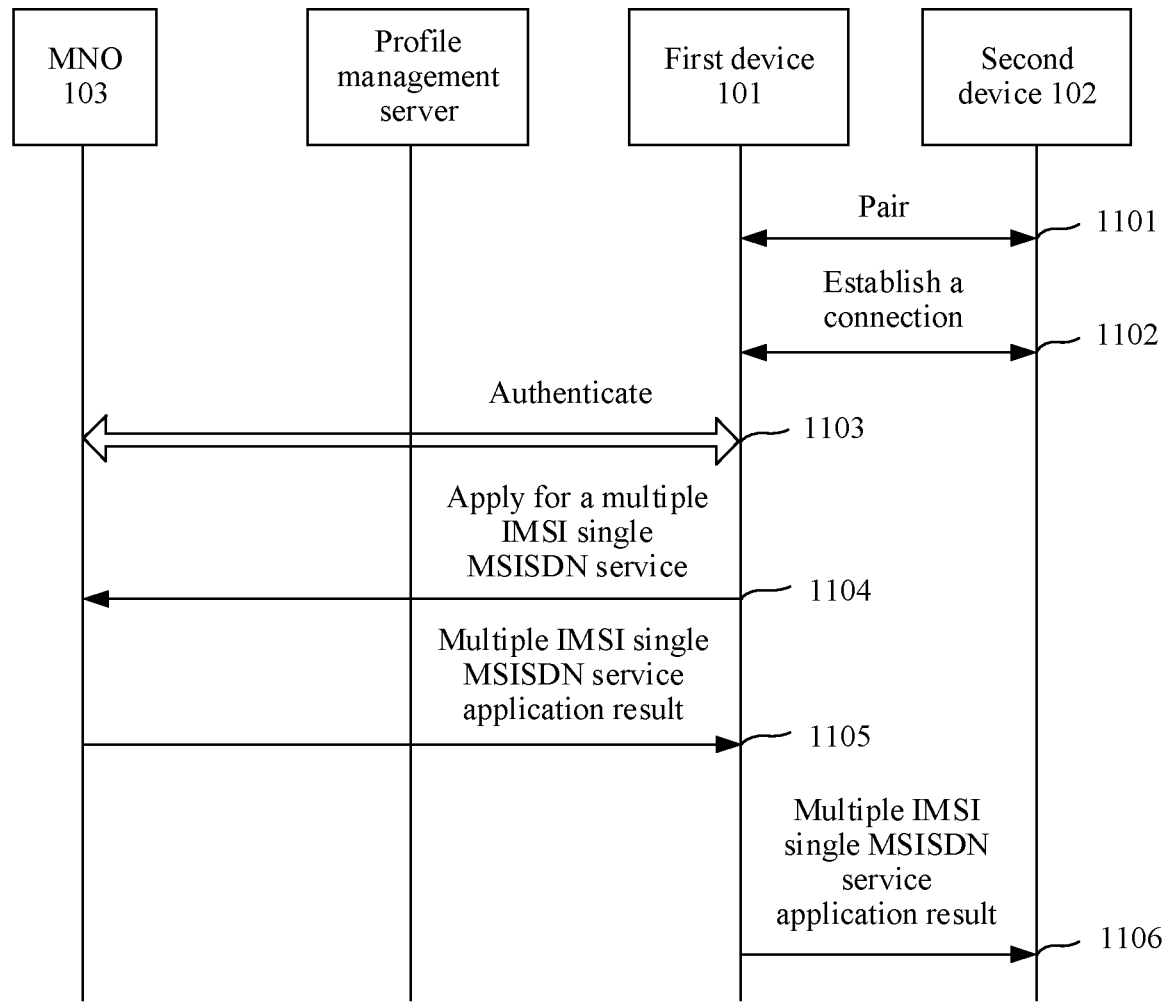
FIG. 11 is a flowchart of a multiple IMSI single MSISDN service activation method according to an embodiment of this application.

FIG. 11 is a flowchart of a multiple IMSI single MSISDN service activation method according to an embodiment of this application.

In FIG. 11, both a first device 101 and a second device 102 are UICC devices. The first device 101 has accessed a network of an MNO 103, for example, has purchased a UICC of the MNO 103 and activated a 3G/4G package through real-name registration, and may use the network and an application service of the MNO 103. The second device 102 purchased by a user also uses the UICC, and the user wants to activate a multiple IMSI single MSISDN service for the first device 101 and the second device 102. In this case, a mobile station international ISDN number MSISDN (Mobile Station International ISDN Number) of the first device 101 is corresponding to an IMSI (International Mobile Subscriber Identity) number of the first device 101 and an IMSI number of the second device 102. That is, the first device 101 and the second device 102 may share one MSISDN number.

Referring to FIG. 11, step 1101 to step 1103 are similar to step 401 to step 403 in FIG. 4, and details are not described herein. In step 1104, the first device 101 may apply to the MNO 103 for the multiple IMSI single MSISDN service, and the first device 101 provides an identifier (for example, an integrated circuit card identifier (Integrate Circuit Card Identity, ICCID), an MSISDN, and an IMSI) of the first device and an identifier (for example, an integrated circuit card identifier (Integrate Circuit Card Identity, ICCID), an MSISDN, and an IMSI) of the second device 102 for the MNO 103. The MNO 103 activates the multiple IMSI single MSISDN service according to the identifier of the first device 101 and the identifier of the second device 102. In step 1105, the MNO 103 notifies the first device 101 of a multiple IMSI single MSISDN service application result. In step 1106, the first device 101 notifies the second device 102 of the multiple IMSI single MSISDN service application result.

It should be noted that step 1103 in FIG. 11 may occur before step 1101 and step 1102, that is, the first device 101 is authenticated by the mobile network operator before the first device 101 and the second device 102 are paired. The authentication may use the EAP-SIM/AKA authentication or SMS verification code authentication mentioned above. A sequence of the steps should not impose a limitation on this application.

Figure 12A:
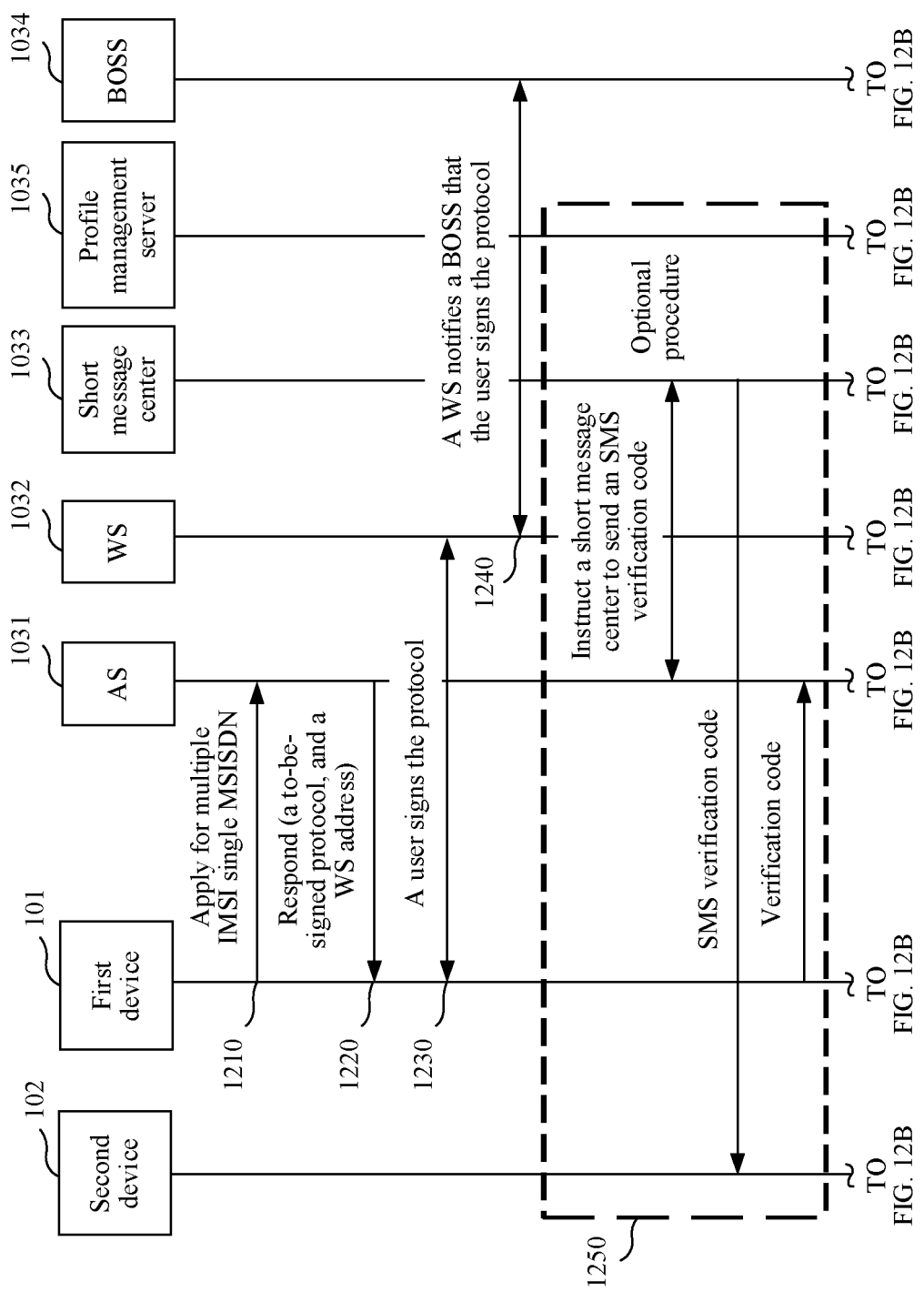
FIG. 12A and FIG. 12B are a schematic diagram of a multiple IMSI single MSISDN service activation method according to another embodiment of this application.
Figure 12B:
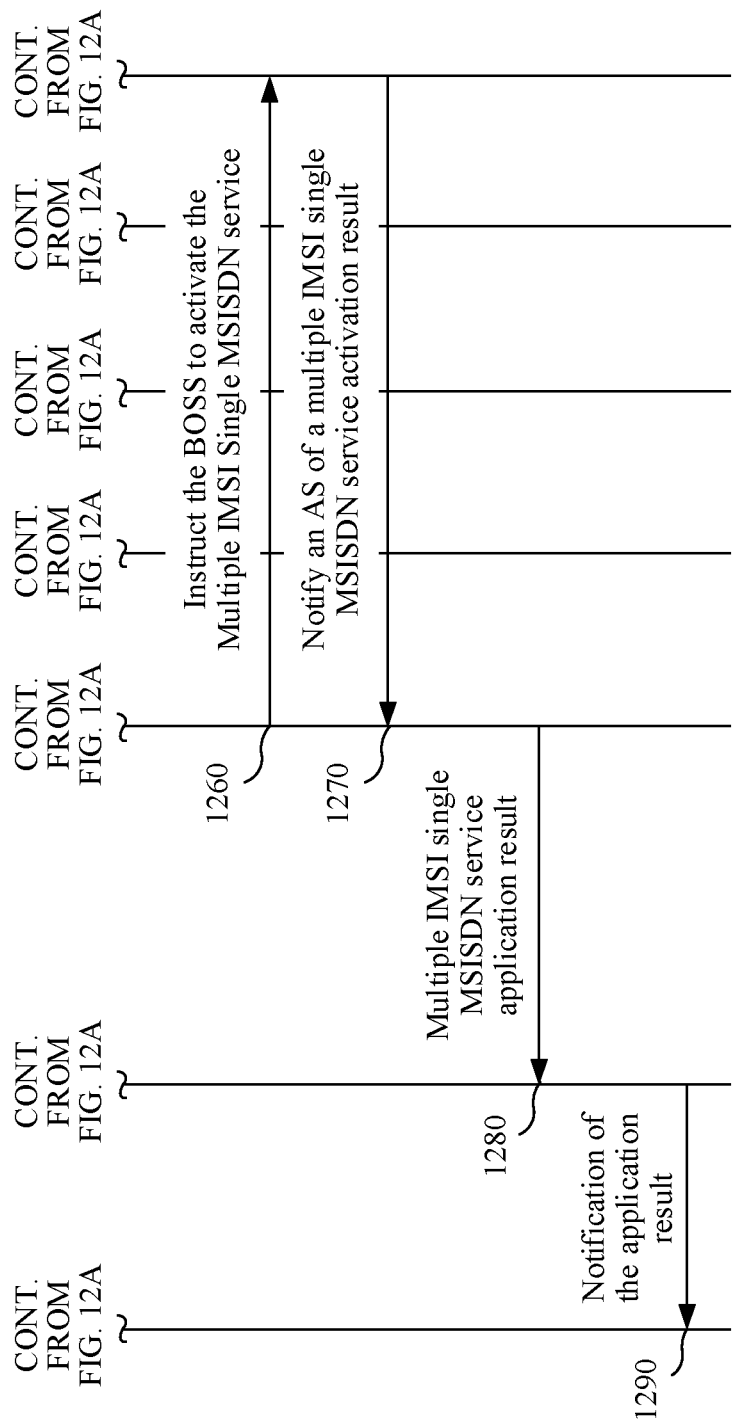

FIG. 12A and FIG. 12B are a schematic diagram of a multiple IMSI single MSISDN service activation method according to another embodiment of this application.

Referring to FIG. 12A and FIG. 12B, step 1210 to step 1240 are similar to step 6010 to step 6040 in FIG. 6A, FIG. 6B, and FIG. 6C, and details are not described herein. In step 1210, an identifier of a first device 101 and an identifier of a second device 102 are carried. The second device 102 is a UICC device. Therefore, the identifier of the first device herein includes any one of an integrated circuit card identifier (Integrate Circuit Card Identity, ICCID), an MSISDN, and an IMSI). The identifier of the second device 102 includes any one of an integrated circuit card identifier (Integrate Circuit Card Identity, ICCID), an MSISDN, and an IMSI.

Step 1250 is an optional procedure. Optionally, SMS verification code verification is performed on the second device 102. An authorization server (Authorization Server, AS) 1031 instructs a short message center 1033 to send an SMS verification code to the second device 102, and a user sends the verification code to the authorization server (Authorization Server, AS) 1031 by using the first device 101, so as to verify validity of the second device 102.

Step 1260 to step 1290 are similar to step 6140 to step 6170 in FIG. 6A, FIG. 6B, and FIG. 6C, and details are not described herein. The authorization server 1031 applies to a BOSS system 1034 for a multiple IMSI single MSISDN service for the first device 101 and the second device 102. The BOSS system 1034 is responsible for processing the multiple IMSI single MSISDN service of the first device 101 and the second device 102. In this case, a mobile station international ISDN number MSISDN (Mobile Station International ISDN Number) of the first device 101 is corresponding to an IMSI (International Mobile Subscriber Identity) number of the first device 101 and an IMSI number of the second device 102. That is, the first device 101 and the second device 102 may share one MSISDN number.

Figure 13:
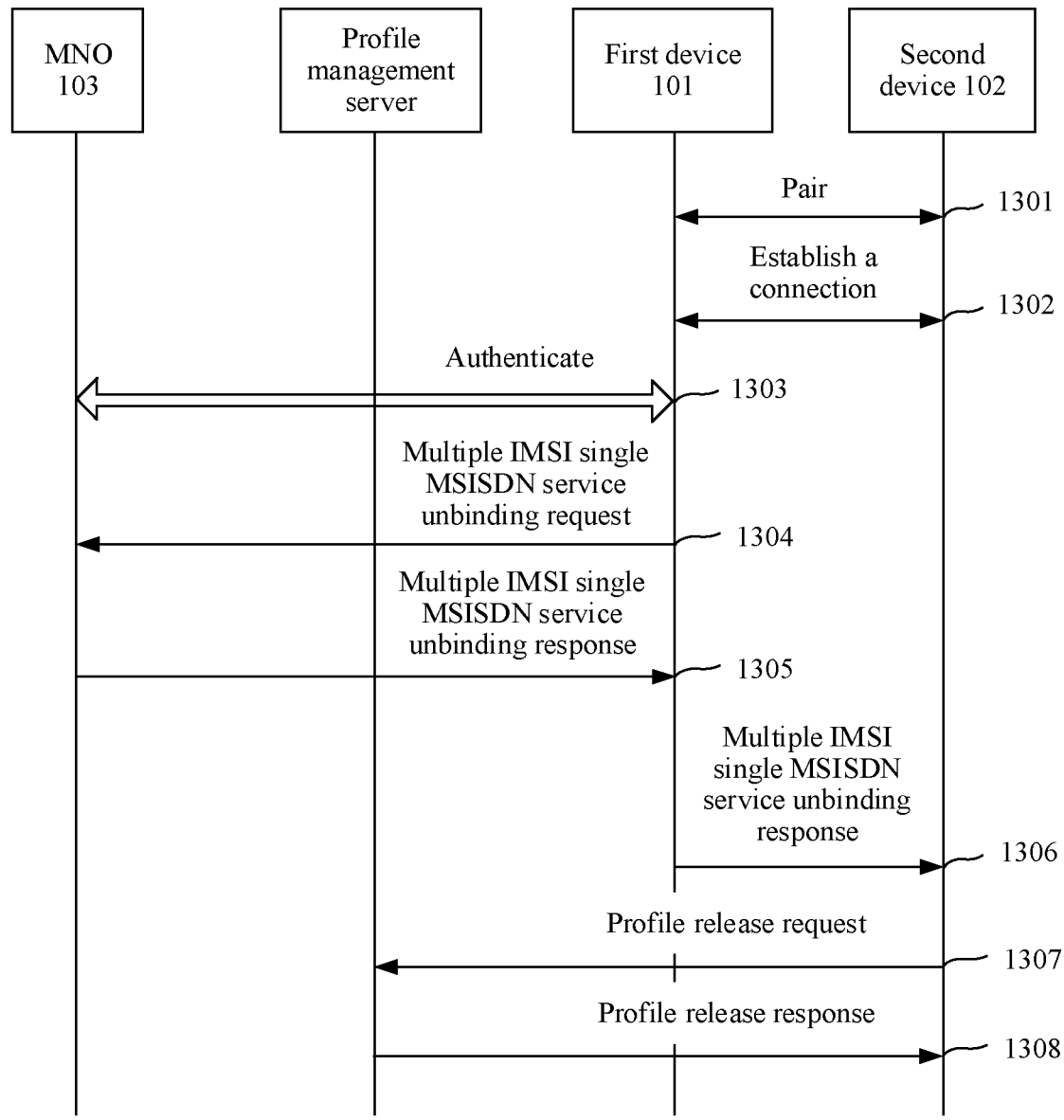
FIG. 13 is a flowchart of a multiple IMSI single MSISDN service unbinding method according to an embodiment of this application.

FIG. 13 is a flowchart of a multiple IMSI single MSISDN service unbinding method according to an embodiment of this application.

In FIG. 13, step 1301 to step 1303 are the same as step 401 to step 403 in FIG. 4. In step 1304, a first device 101 may apply to an MNO 103 for a multiple IMSI single MSISDN service unbinding operation, that is, to unbind a multiple IMSI single MSISDN service binding relationship between the first device 101 and a second device 102. The first device 101 provides an identifier (for example, an integrated circuit card identifier (Integrate Circuit Card Identity, ICCID), an MSISDN, and an IMSI) of the first device and an identifier (for example, an EID, an MSISDN, and an IMSI) of the second device 102 for the MNO 103. The MNO 103 unbinds the multiple IMSI single MSISDN service binding relationship between the first device 101 and the second device 102 according to the identifier of the first device 101 and the identifier of the second device 102. In step 1305, the MNO 103 notifies the first device 101 of a multiple IMSI single MSISDN service unbinding operation result. In step 1306, the first device 101 notifies the second device 102 of the multiple IMSI single MSISDN service unbinding operation result. Optionally, in step 1307, the second device 102 sends a profile release request to a profile management server. In step 1308, the second device 102 receives a profile release result from the profile management server. The second device 102 may delete a profile stored in an eUICC.

It should be noted that step 1303 in FIG. 13 may occur before step 1301 and step 1302, that is, the first device 101 is authenticated by the mobile network operator before the first device 101 and the second device 102 are paired. The authentication may use the EAP-SIM/AKA authentication or SMS verification code authentication mentioned above. A sequence of the steps should not impose a limitation on this application.

The foregoing mainly describes a process in which an eUICC device performs authentication and downloads a profile by using a UICC device. For an electronic device that has both a universal integrated circuit card UICC and an embedded UICC (eUICC), a method similar to the above may be used. Authentication is performed by using the embedded UICC of the electronic device, and after the authentication succeeds, a profile is downloaded and installed in the eUICC.

A specific solution includes: The electronic device gets, based on the UICC, authenticated by a mobile operator network; receives authentication completion information (for example, an SMS verification code or authentication success information) from the mobile operator network; sends, based on the authentication completion information, an embedded integrated circuit card identifier (EID) of the eUICC to the mobile operator network, where the EID is used by the electronic device to obtain, from a server of the mobile operator network, profile download information that matches the EID; receives the profile download information from the server of the mobile operator network; and downloads the profile from a profile management server according to the profile download information, where the profile is installed in the eUICC of the electronic device after the download is complete.

Figure 14:
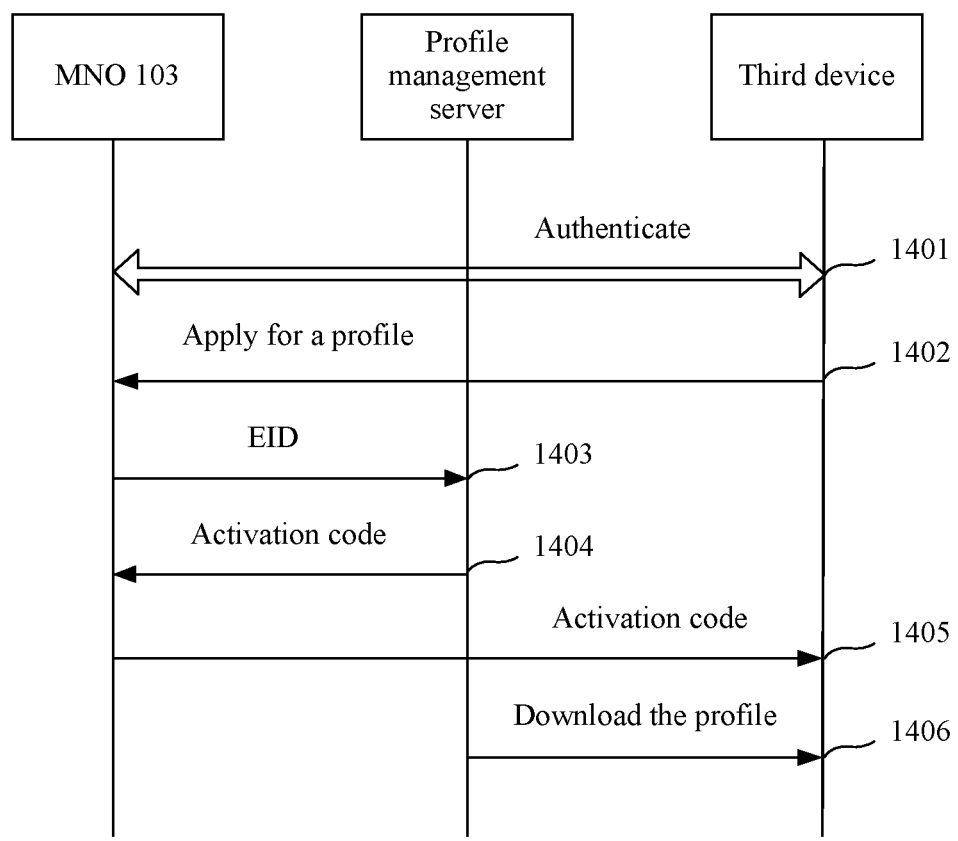
FIG. 14 is a flowchart of a profile download method according to another embodiment of this application.

FIG. 14 is a flowchart of a profile download method according to another embodiment of this application.

In FIG. 14, a third device supports both a UICC and an eUICC (for example, the third device has a SIM card slot and is preconfigured with an embedded subscriber identity module (eSIM) chip). The third device may have at least one SIM card slot and at least one eSIM chip.

A user of the third device has accessed a network of an MNO 103, for example, has purchased a UICC card of the MNO 103 and activated a 3G/4G package through real-name registration. The user may use the network and an application service of the MNO 103 by inserting the UICC card into the SIM card slot. The user further needs to download a profile for the eUICC to activate a communication service of the eUICC. By using a SIM card installed in the third device, the operator may verify validity of the user and download the profile of the eUICC for the authorized user.

Referring to FIG. 14, in step 1401, the third device and the MNO 103 perform an authentication operation to verify validity of the third device. The authentication operation may use a verification code method. For example, the MNO randomly generates a verification code, and sends an SMS message to a mobile phone number used by the UICC card of the third device of the user, so as to notify the user of the verification code. The user enters the verification code to perform secondary verification, so as to ensure subscriber identity correctness. The authentication operation in step 1401 may alternatively use SIM card-based EAP-SIM/AKA authentication. The third device completes authentication according to an authentication protocol.

In step 1402, if the authentication of the third device succeeds in step 1401, the third device may apply to the MNO 103 for a profile for the eUICC of the third device. The third device provides an eUICC identifier (EID) of the third device for the MNO 103 to obtain the profile.

In step 1403, the MNO 103 transfers the EID of the third device to a profile management server. The profile management server prepares a profile activation code that matches the EID, and transfers the activation code to the MNO 103 in step 1404. In step 1405, the MNO 103 transfers the activation code to the third device. In step 1406, the third device establishes a connection to the profile management server by using a network, and obtains the profile of the eUICC.

It should be noted that FIG. 14 only describes a process of verifying the validity of the third device by using the UICC of the third device and downloading the profile for the eUICC of the third device. Optionally, in step 1402, the third device may apply to the MNO 103 for both profile download and a multiple IMSI single MSISDN service, that is, transfer identification information (for example, an ICCID, an MSISDN, and an IMSI) of the SIM card and the identifier EID of the eUICC. A specific application process is similar to that of FIG. 5, and details are not described herein. After the multiple IMSI single MSISDN service is activated, the UICC card and the eUICC of the third device may share one MSISDN number.

Figure 15:
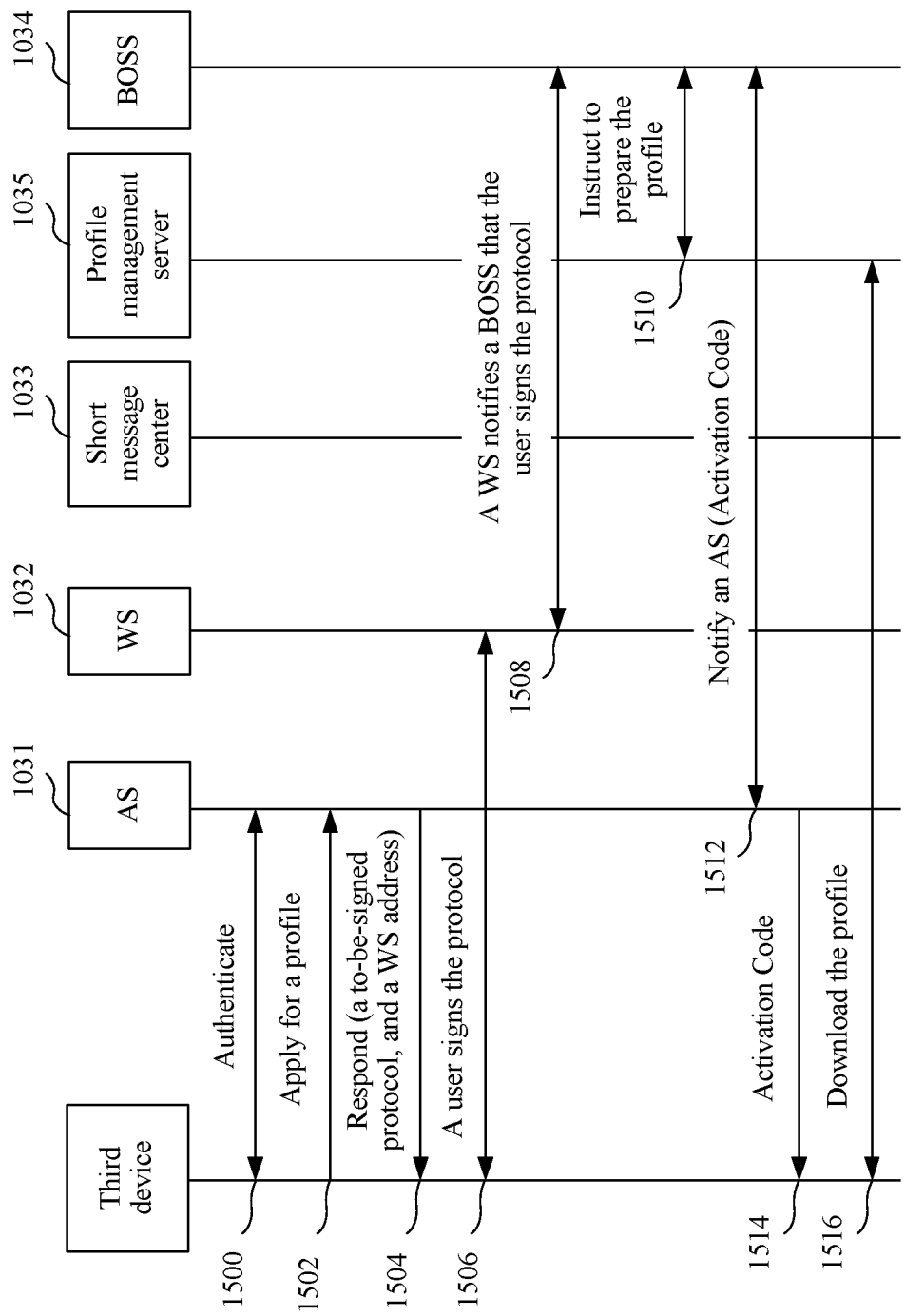
FIG. 15 is a schematic diagram of a profile download method according to another embodiment of this application.

FIG. 15 is a schematic diagram of a profile download method according to another embodiment of this application.

Referring to FIG. 15, in step 1500, an authorization server 1031 verifies validity of a third device. Specifically, authentication may be performed on a UICC card of the third device by using the EAP-SIM/AKA authentication or SMS verification code authentication manner mentioned above.

Step 1502 to step 1514 are similar to step 6010 to step 6070 in FIG. 6A, FIG. 6B, and FIG. 6C, and details are not described herein. In step 1502, a profile download request sent by the third device to the authorization server carries an identifier (EID) of an eUICC of the third device.

In step 1516, the third device downloads a profile from a profile management server 1035 by using an activation code obtained in step 1514. Then, after the third device completes profile activation, the eUICC of the third device takes effect, and the third device may use the eUICC to obtain a communication service.

An embodiment of this application provides another terminal to implement various functions of the third device in FIG. 15. The terminal includes: a communications unit, a universal integrated circuit card UICC, an embedded UICC (eUICC), and a processor. The processor is configured to: authenticate, based on the UICC, the electronic device with a mobile operator network; obtain authentication completion information from the mobile operator network; based on the authentication completion information, control the communications unit to send an embedded integrated circuit card identifier (EID) of the eUICC to the mobile operator network, where the EID is used by the electronic device to obtain, from a server of the mobile operator network, profile download information that matches the EID; obtain the profile download information from the server of the mobile operator network; and download a profile from a profile management server according to the profile download information, where the profile is installed in the eUICC of the electronic device after the download is complete.

Figure 16:
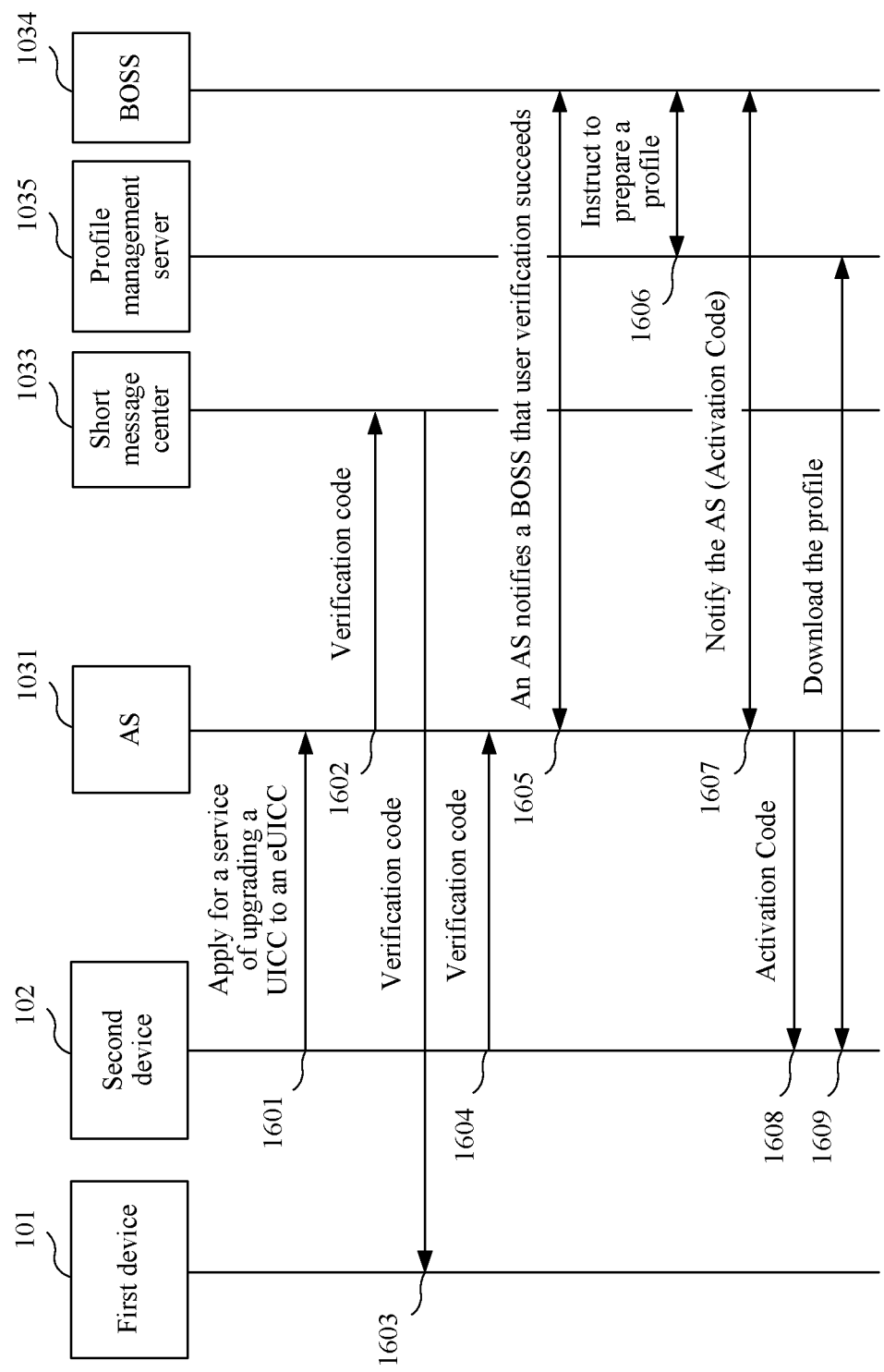
FIG. 16 is a schematic diagram of a profile download method according to another embodiment of this application.

FIG. 16 is a schematic diagram of a profile download method according to another embodiment of this application.

In FIG. 16, a first device 101 and a second device 102 belong to a same user. The first device 101 has a same function as the first device 101 in FIG. 1, and the second device 102 has a same function as the second device 102 in FIG. 1. A universal integrated circuit card (UICC) that can be inserted into the first device 101 and can be removed from the first device 101 is installed in the first device 101. The second device 102 uses an embedded UICC (eUICC) that replaces the UICC and that is embedded into the second device 102 in an irremovable manner.

The second device 102 is a device newly purchased by the user for replacing the old first device 101, and the user wants to still use an original phone number after the device is replaced. After the second device 102 receives an eUICC service upgrade request entered by the user, downloads a profile, and completes profile activation, the new card (for example, the eUICC of the second device 102) takes effect, and the old card (for example, the UICC of the first device 101) becomes invalid. This is similar to a 4G card replacement service (that is, the user discards an old SIM card, and uses a new SIM card) in an existing service of an operator. However, the second device 102 herein uses the embedded UICC (eUICC) that is embedded into the terminal and irremovable. Therefore, a procedure is different.

The second device 102 sends a profile obtaining request (also referred to as an "eUICC upgrade request") to a server of a mobile operator network. The profile obtaining request carries an embedded integrated circuit card identifier (EID) of the second device 102 and a mobile station international ISDN number MSISDN of the first device 101. The EID is used by the second device 102 to obtain, from the server of the mobile operator network, profile download information that matches the EID. The second device 102 sends a verification code to the server of the mobile operator network. The verification code is a verification code received by the first device 101 (for example, the user may use the second device 102 to manually enter the verification code received by the first device 101, or the user may use the second device 102 to obtain, by using short-range communication (for example, NFC) or in a manner of scanning a quick response code, the verification code received by the first device 101). The second device 102 receives the profile download information from the mobile operator server. The second device 102 downloads the profile from a profile management server according to the profile download information. The profile is installed in the embedded UICC (eUICC) of the second device 102 after the download is complete.

Referring to FIG. 16, in step 1601, the second device 102 sends an "upgrade to an eUICC" request to an authorization server 1031. The "upgrade to an eUICC" request carries the mobile station international ISDN number MSISDN of the user and the embedded integrated circuit card identifier (EID) of the second device 102.

In step 1602, the authorization server 1031 generates the verification code and sends the verification code to a short message center 1033.

In step 1603, the short message center 1033 sends the verification code to the first device 101 of the user in an SMS message manner, so as to notify the user of the verification code.

In step 1604, the second device 102 receives the verification code entered by the user, and sends the verification code to the authorization server 1031. Then, the authorization server 1031 verifies the verification code. If the verification succeeds, in step 1605, the authorization server 1031 notifies a BOSS 1034 that the user verification succeeds.

In step 1606, the BOSS system 1034 instructs the profile management server 1035 to prepare the profile and the profile download information (an activation code).

In step 1607, the BOSS system 1034 sends the activation code (Activation Code) to the authorization server 1031.

In step 1608, the authorization server 1031 sends the activation code (Activation Code) to the second device 102.

In step 1609, the second device 102 downloads the profile from the profile management server 1035 by using the activation code obtained in step 1608.

After the second device 102 downloads the profile and successfully activates the profile, the eUICC of the second device 102 takes effect, the old card (the UICC of the first device 101) becomes invalid, and the user may use the original phone number to perform a call service by using the second device 102.

Another embodiment of this application provides a terminal to implement various functions of the second device in FIG. 16. The terminal includes: a communications unit, an embedded UICC (eUICC), and a processor. The processor is configured to: control the communications unit to send a profile obtaining request to a server of a mobile operator network, where the profile obtaining request carries an embedded integrated circuit card identifier (EID) of the terminal and a mobile station international ISDN number MSISDN of a first device, and the EID is used by the terminal to obtain, from the server of the mobile operator network, profile download information that matches the EID; control the communications unit to send a verification code to the server of the mobile operator network, where the verification code is a verification code received by the first device; obtain the profile download information from the mobile operator server; and download a profile from a profile management server according to the profile download information, where the profile is installed in the embedded UICC (eUICC) of the terminal after the download is complete.

Figure 17:
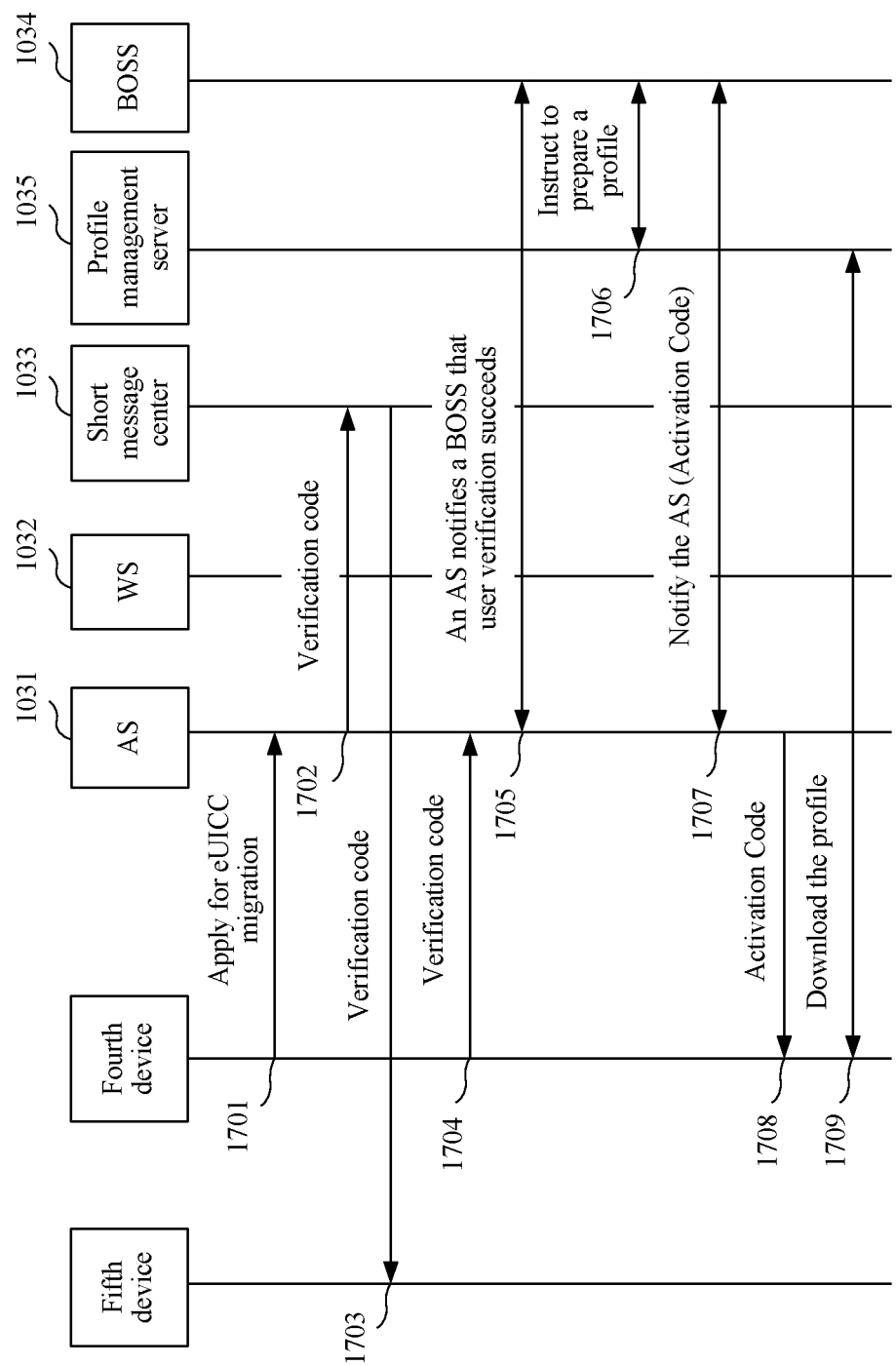
FIG. 17 is a schematic diagram of a profile download method according to another embodiment of this application.

FIG. 17 is a schematic diagram of a profile download method according to another embodiment of this application.

In FIG. 17, a fourth device and a fifth device belong to a same user. Both the fourth device and the fifth device use an embedded UICC (eUICC) that replaces a UICC and that is embedded into the device in an irremovable manner.

The fifth device has previously accessed a network of an MNO 103, for example, the eUICC of the fifth device downloads a profile and activates a communication service of the MNO 103. The user may use the network and an application service of the MNO 103 by using the fifth device. The fourth device is a device newly purchased by the user for replacing the old fifth device, and the user wants to still use an original phone number after the device is replaced. After the fourth device receives an eUICC service migration request entered by the user, downloads the profile, and completes profile activation, the eUICC of the fourth device completes profile download and takes effect, and the profile of the eUICC of the fifth device becomes invalid. This is similar to a 4G card replacement service (that is, the user discards an old SIM card, and uses a new SIM card) in an existing service of the operator. However, both the fourth device and the fifth device herein use the embedded UICC (eUICC) that is embedded into the terminal and irremovable. Therefore, a procedure is different.

The fourth device sends a profile obtaining request (also referred to as an "eUICC migration request") to a server of a mobile operator network. The profile obtaining request carries an embedded integrated circuit card identifier (EID) of the fourth device and a mobile station international ISDN number MSISDN of the fifth device. The EID is used by the fourth device to obtain, from the server of the mobile operator network, profile download information that matches the EID. The fourth device sends a verification code to the server of the mobile operator network. The verification code is a verification code received by the fifth device (for example, the user may use the fourth device to manually enter the verification code received by the fifth device, or the user may use the fifth device to obtain, by using short-range communication (for example, NFC) or in a manner of scanning a quick response code, the verification code received by the fourth device). The fourth device receives the profile download information from the mobile operator server. The fourth device downloads the profile from a profile management server according to the profile download information. The profile is installed in the embedded UICC (eUICC) of the fourth device after the download is complete.

Referring to FIG. 17, in step 1701, the fourth device sends an "eUICC migration" request to an authorization server 1031. The "eUICC migration" request carries the mobile station international ISDN number MSISDN of the user and the embedded integrated circuit card identifier (EID) of the fourth device.

Step 1702 to step 1709 are similar to step 1602 to step 1609 in FIG. 16, and details are not described herein.

After the fourth device downloads and successfully activates the profile, the eUICC of the fourth device takes effect, the profile of the eUICC of the fifth device becomes invalid, and the user may use the original phone number to perform a communication service (a call or an SMS message) by using the fourth device.

An embodiment of this application provides a terminal to implement various functions of the fourth device in FIG. 17. The terminal includes: a communications unit, an embedded UICC (eUICC), and a processor. The processor is configured to: control the communications unit to send a profile obtaining request to a server of a mobile operator network, where the profile obtaining request carries an embedded integrated circuit card identifier (EID) of the terminal and a mobile station international ISDN number MSISDN of a fifth device, and the EID is used by the terminal to obtain, from the server of the mobile operator network, profile download information that matches the EID; control the communications unit to send a verification code to the server of the mobile operator network, where the verification code is a verification code received by the fifth device; obtain the profile download information from the mobile operator server; and download a profile from a profile management server according to the profile download information, where the profile is installed in the embedded UICC (eUICC) of the terminal after the download is complete.

In the device that is configured to implement this application, the processor may be a general purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various examples of logical blocks, modules, and circuits that are described with reference to content disclosed in this application.

Method or algorithm steps described in combination with the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. A person skilled in the art should easily be aware that, units and algorithm steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

The invention claimed is:

1. A system, comprising:
a first device configured to:
obtain an embedded universal integrated circuit card (eUICC) identifier (EID) of a second device;
send, to a mobile operator network, a first message indicating a profile download request, wherein the first message comprises the EID; and
send an unbinding request to the mobile operator network for unbinding a multiple-device, single-mobile subscriber integrated services digital network number (MSISDN)-service, binding relationship between the first device and the second device; and
the second device comprising an eUICC and configured to:
install a profile associated with the EID in the eUICC, wherein an MSISDN of the first device is shared by the second device; and
delete the profile in the eUICC in response to receiving an unbinding operation indication.

2. The system of claim 1, wherein the first device is further configured to obtain the EID via a BLUETOOTH connection between the first device and the second device.

3. The system of claim 1, wherein the first message further comprises an identifier of the first device, and wherein the identifier comprises any one of an integrated circuit card identity (ICCID), an MSISDN, or an international mobile subscriber identity (IMSI).

4. The system of claim 1, wherein the first device is further configured to:
display a web page comprising contract information; and
receive a user input for approving a service term of the contract information.

5. The system of claim 1, wherein the first device is further configured to receive the profile from a profile management server.

6. The system of claim 1, wherein the unbinding request comprises a first identifier of the first device and a second identifier of the second device.

7. The system of claim 1, wherein the first device is further configured to:

perform an authentication process with the mobile operator network, wherein the authentication process comprises an Extensible Authentication Protocol-Authentication and Key Agreement (EAP-AKA) authentication process; and
obtain authentication success information from the mobile operator network in response to the authentication process.

8. The system of claim 1, wherein the second device is further configured to delete the profile by:
sending a profile release request to a profile management server;
receiving a profile release result from the profile management server in response to the profile release request; and
deleting the profile in response to the profile release result.

9. A first device, comprising:
a processor; and
a memory coupled to the processor and configured to store programming instructions that, when executed by the processor, cause the first device to:
obtain an embedded universal integrated circuit card (eUICC) identifier (EID) of a second device;
send, to a mobile operator network, a first message indicating a profile download request, wherein the first message comprises the EID of the second device; and
send an unbinding instruction to the second device for deleting a profile associated with the EID in the eUICC of the second device.

10. The first device of claim 9, wherein the programming instructions cause the first device to obtain the EID of the second device via a BLUETOOTH connection with the second device.

11. The first device of claim 9, wherein the first message further comprises an identifier of the first device, and wherein the identifier of the first device comprises any one of an integrated circuit card identity (ICCID), an MSISDN, or an international mobile subscriber identity (IMSI).

12. The first device of claim 9, wherein the programming instructions further cause the first device to:
display a web page comprising contract information; and
receive a user input for approving a service term of the contract information.

13. The first device of claim 9, wherein the profile comprises an address of a profile management server.

14. The first device of claim 9, wherein the unbinding instruction comprises a first identifier of the first device and a second identifier of the second device.

15. The first device of claim 9, wherein the programming instructions further cause the first device to:
perform an authentication process with the mobile operator network; and
obtain authentication success information from the mobile operator network.

16. The first device of claim 15, wherein the authentication process is an Extensible Authentication Protocol-Authentication and Key Agreement (EAP-AKA) authentication process.

17. A computer program product comprising instructions stored on a non-transitory computer-readable medium that, when executed by a processor, cause a first device to:
obtain an embedded universal integrated circuit card (eUICC) identifier (EID) of a second device;
send, to a mobile operator network, a first message indicating a profile download request, wherein the first message comprises the EID of the second device; and send an unbinding instruction to the second device for deleting a profile associated with the EID in the eUICC of the second device.

18. The computer program product of claim 17, wherein the instructions cause the first device to obtain the EID of the second device via a BLUETOOTH connection with the second device.

19. The computer program product of claim 17, wherein the first message further comprises an identifier of the first device, and wherein the identifier of the first device comprises any one of an integrated circuit card identity (ICCID), an MSISDN, or an international mobile subscriber identity (IMSI).

20. The computer program product of claim 17, wherein the instructions further cause the first device to:
- display a web page comprising contract information; and
- receive a user input for approving a service term of the contract information.

\* \* \* \* \*